United States Patent
Ursino et al.

(10) Patent No.: US 12,126,258 B2
(45) Date of Patent: Oct. 22, 2024

(54) POWER SUPPLY AND INTEGRATED MAGNETIC ASSEMBLY IMPLEMENTATIONS

(71) Applicant: Infineon Technologies Austria AG, Villach (AT)

(72) Inventors: Mario Ursino, Villach (AT); Stefano Saggini, Udine (IT); Roberto Rizzolatti, Villach (AT)

(73) Assignee: Infineon Technologies Austria AG, Villach (AT)

( * ) Notice: Subject to any disclaimer, the term of this patent is extended or adjusted under 35 U.S.C. 154(b) by 104 days.

(21) Appl. No.: 17/670,755

(22) Filed: Feb. 14, 2022

(65) Prior Publication Data

US 2023/0261571 A1 Aug. 17, 2023

(51) Int. Cl.
*H02M 3/156* (2006.01)
*H01F 27/24* (2006.01)

(52) U.S. Cl.
CPC ............ *H02M 3/156* (2013.01); *H01F 27/24* (2013.01)

(58) Field of Classification Search
CPC .... H02M 3/1582; H02M 3/156; H02M 3/157; H02M 3/158; H02M 3/1584; H02M 3/1586; H02M 3/285; H02M 3/33561; H02M 7/49; H02M 1/045; H02M 7/006; H02M 7/06; H02M 7/068; H02M 7/153; H02M 7/10; H02M 1/088; H02M 7/103; H02M 7/106; H02M 7/19; H02M 7/08; H02M 7/17; H02M 2001/007; H02M 7/493; H02M 7/53806; H02M 7/5381; H02M 7/483; H02M 7/217; H02M 7/538466; H02M 7/5387; H02M 7/53871; H02M 7/53873; H02M 7/53875; H02M 1/084; H02M 1/0845; H02M 1/007; H02M 1/0009; H02M 1/08; H02M 3/1588;
(Continued)

(56) References Cited

U.S. PATENT DOCUMENTS

| | | | |
|---|---|---|---|
| 7,872,886 B2* | 1/2011 | Xu ...................... | H02M 3/1584 307/77 |
| 10,164,544 B2* | 12/2018 | Ye ........................... | H02M 1/08 |
| 10,737,586 B2* | 8/2020 | Alves .................... | H02J 7/0068 |

(Continued)

OTHER PUBLICATIONS

Chen Heng, et al., "A Novel High Step-Down DC-DC Converter Based on TSC Buck Converter", 2020 IEEE 9th International Power Electronics and Motion Control Conference (IPEMC2020-ECCE Asia), IEEE, Nov. 29, 2020 (Nov. 29, 2020), pp. 1444-1451, XP033883336.

(Continued)

*Primary Examiner* — Jeffrey A Gblende
(74) *Attorney, Agent, or Firm* — Armis IP Law, LLC

(57) ABSTRACT

A power supply includes an assembly comprising an inductor and a transformer. The inductor and the transformer are integrated to share a core of magnetic permeable material disposed in the assembly. The power supply further includes an unregulated power converter stage and a regulated power converter stage. The unregulated power converter stage implements use of the transformer. The regulated power converter stage implements use of the inductor. A combination of the regulated power converter stage and the unregulated power converter stage operative to collectively produce an output voltage to power a load.

25 Claims, 13 Drawing Sheets

(58) Field of Classification Search
CPC .... H02M 7/5395; H02M 1/14; H02M 1/0043; H02J 3/46; H02J 3/38; H01F 27/24
See application file for complete search history.

(56) References Cited

U.S. PATENT DOCUMENTS

| | | | |
|---|---|---|---|
| 11,545,900 B2* | 1/2023 | Ahmed | H02M 3/01 |
| 2019/0058410 A1* | 2/2019 | Eicher | H01F 27/22 |

OTHER PUBLICATIONS

Extended Search Report, EP 23 15 5885, Jun. 9, 2023, pp. 1-8.
Lang Bastian, et al., "Solving the Power Density Challenge", Mar. 10, 2020 (Mar. 10, 2020), pp. 32-33, XP055822534, Retrieved from the Internet.
Poon N K et al., "A Low Cost DC-DC Stepping Inductance Voltage Regulator With Transient Loading Response", APEC 2001, 16th Annual IEEE Applied Power Electronics Conference and Exposition. Anaheim, CA, Mar. 4-8, 2001; [Annual Applied Power Electronics Conference], New York, NY: IEEE, US, vol. 1, Mar. 4, 2001, pp. 268-272, XP010536006.
Ursino Mario, et al., "High Density Hybrid Switched Capacitor Sigma Converter for Data Center Applications", 2022 IEEE Applied Power Electronics Conference and Exposition (APEC), IEEE, Mar. 20, 2000 (Mar. 20, 2000), pp. 35-39, XP034124649.
Vangalapudi Tilak Bala Gangahar et al., "Quasi-Parallel Voltage Regulator Topology for Powering Laptop Processors", IEEE Transactions on Power Electronics, Institute of Electrical and Electronics Engineers, USA, vol. 32, No. 10, Oct. 1, 2017 (Oct. 1, 2017), pp. 7805-7815, XP011649011.

* cited by examiner

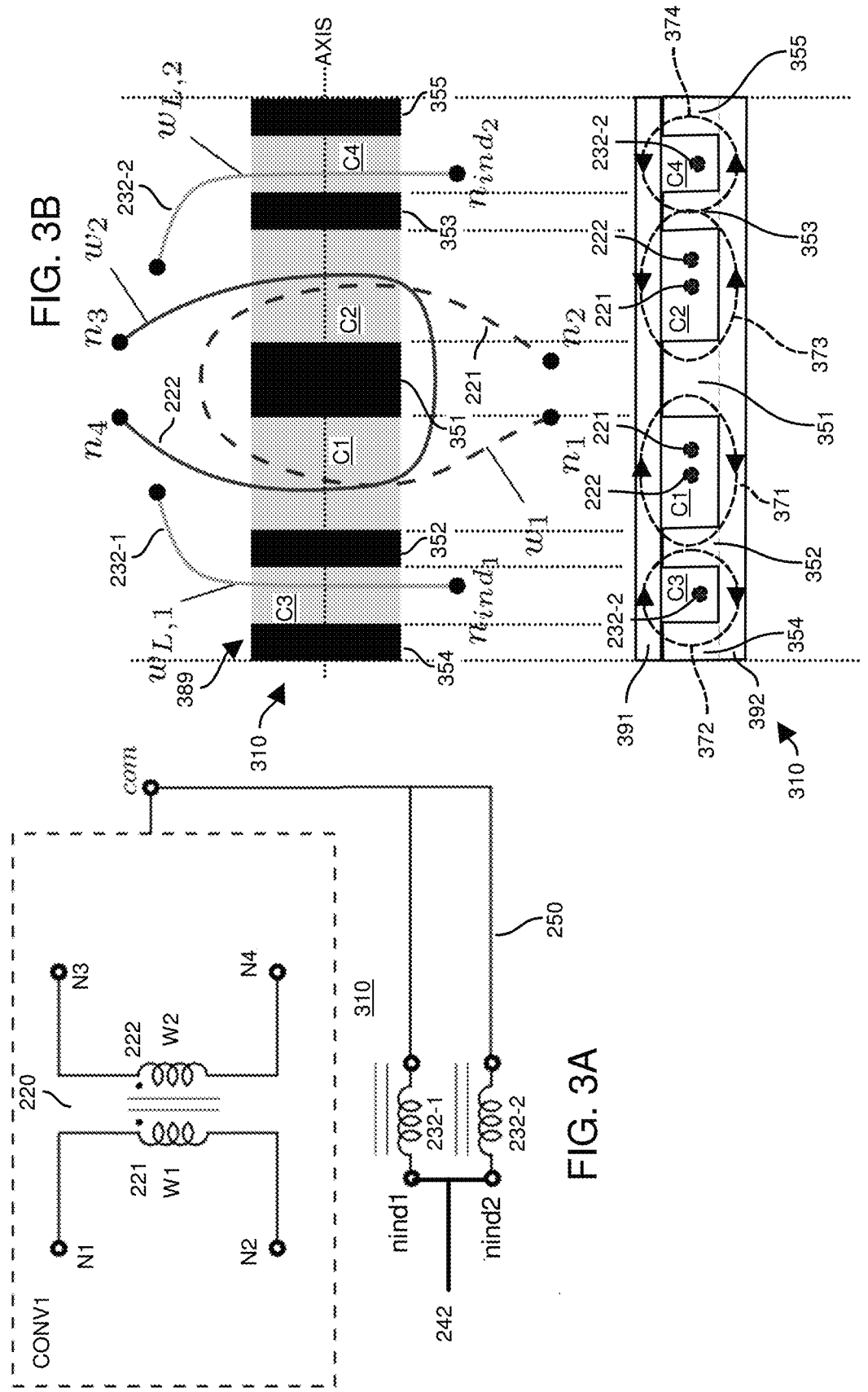

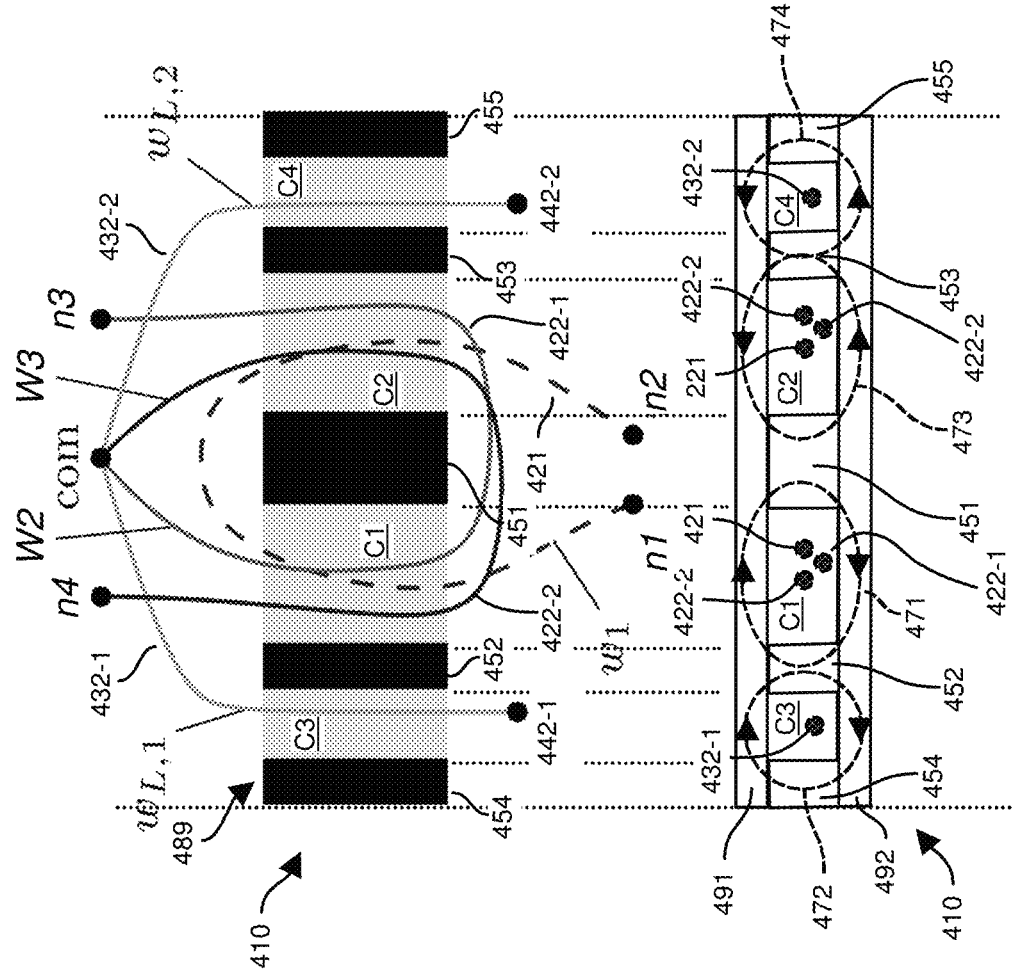
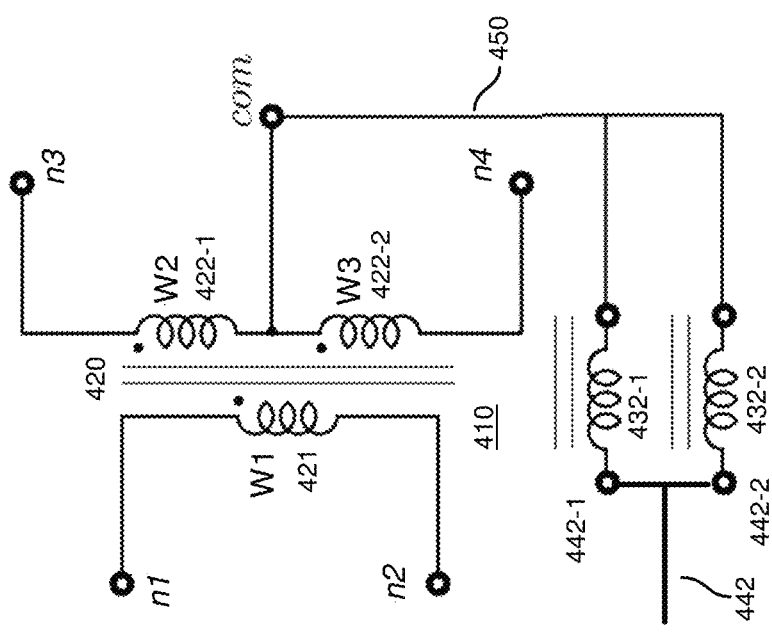
FIG. 4A
FIG. 4B
FIG. 4C

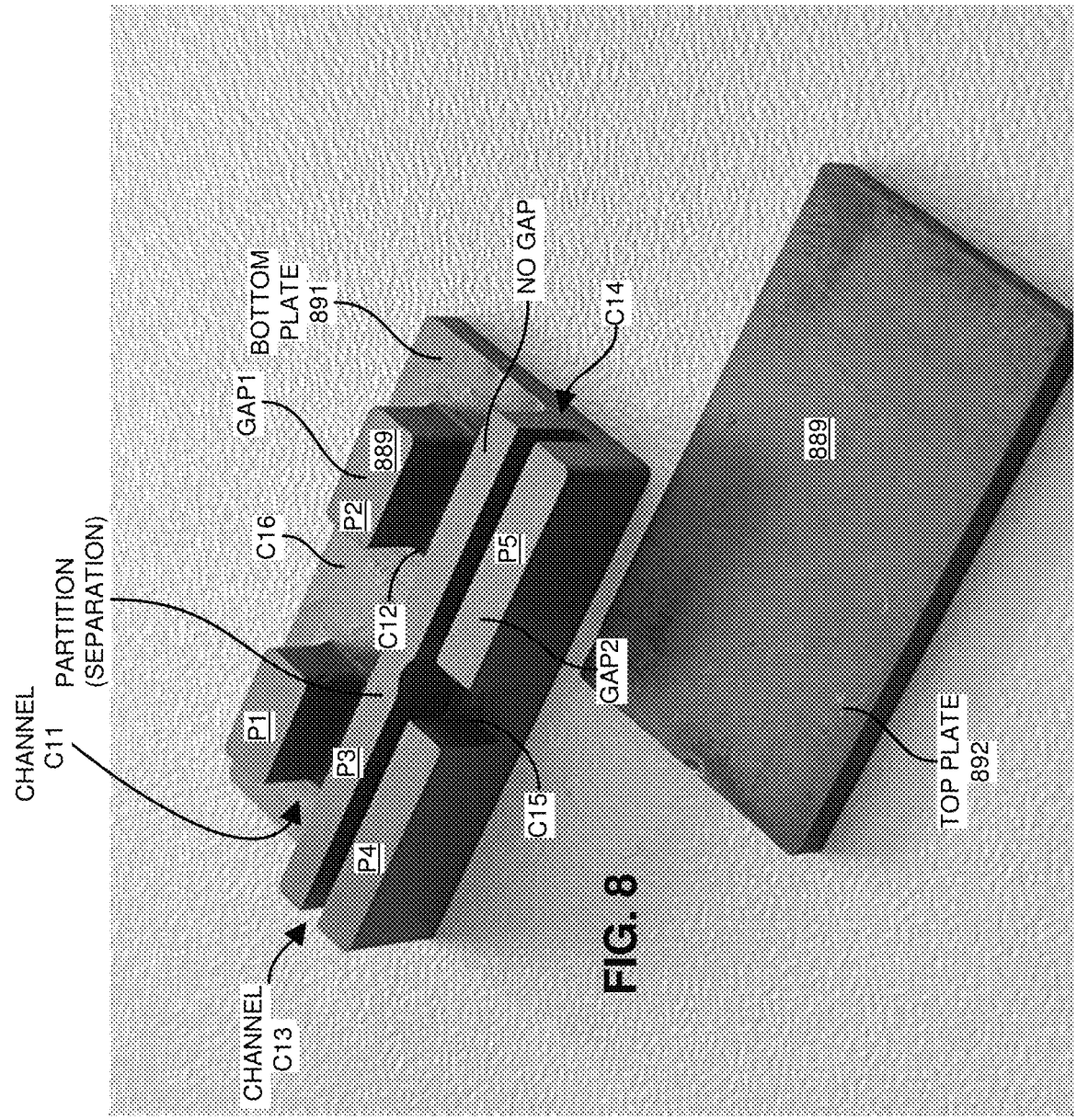

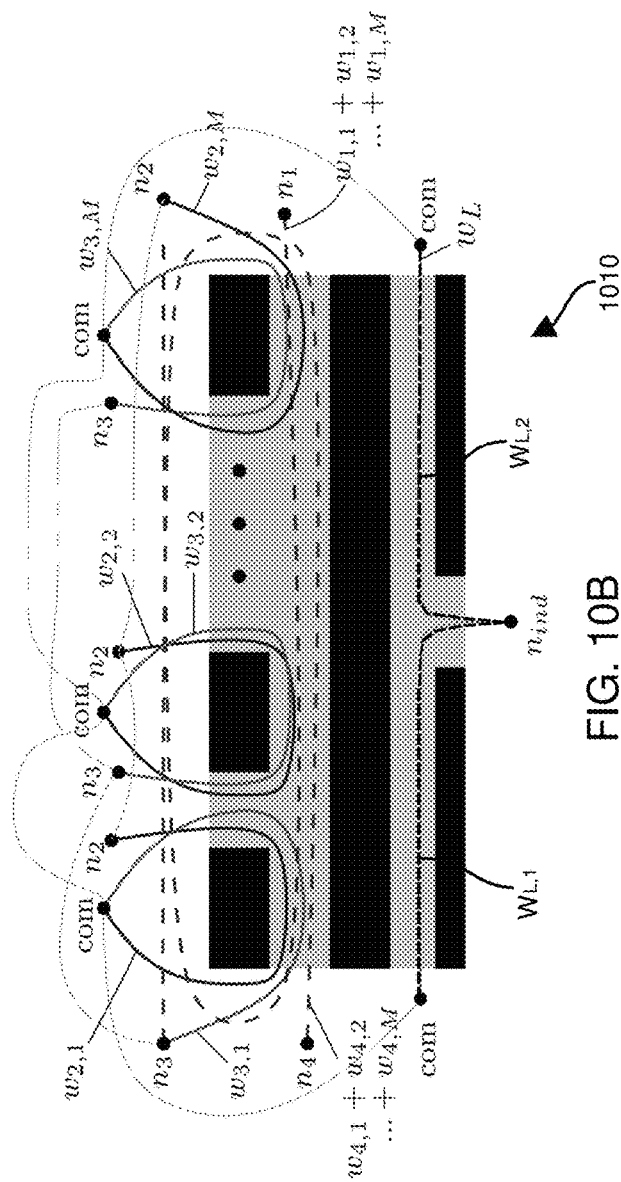
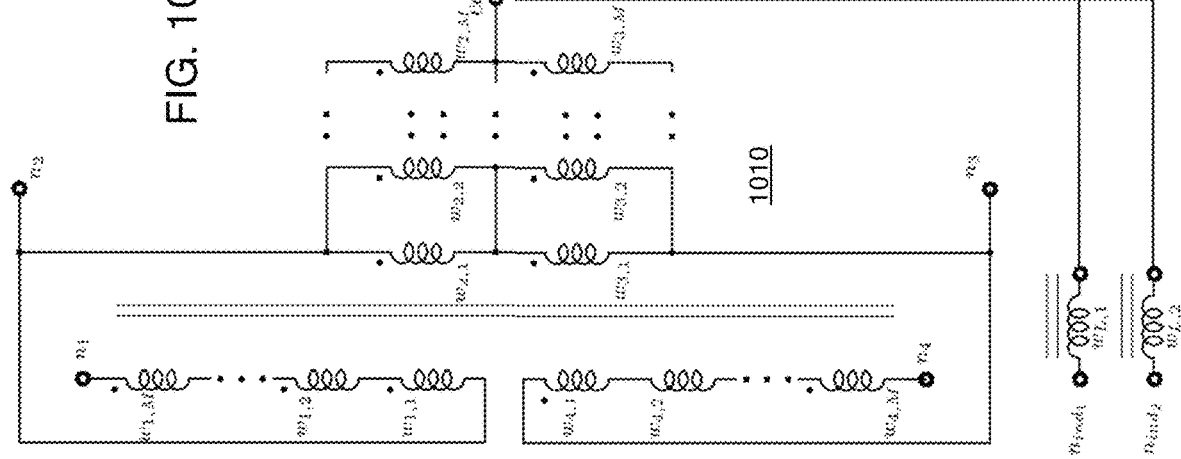
FIG. 10A
FIG. 10B

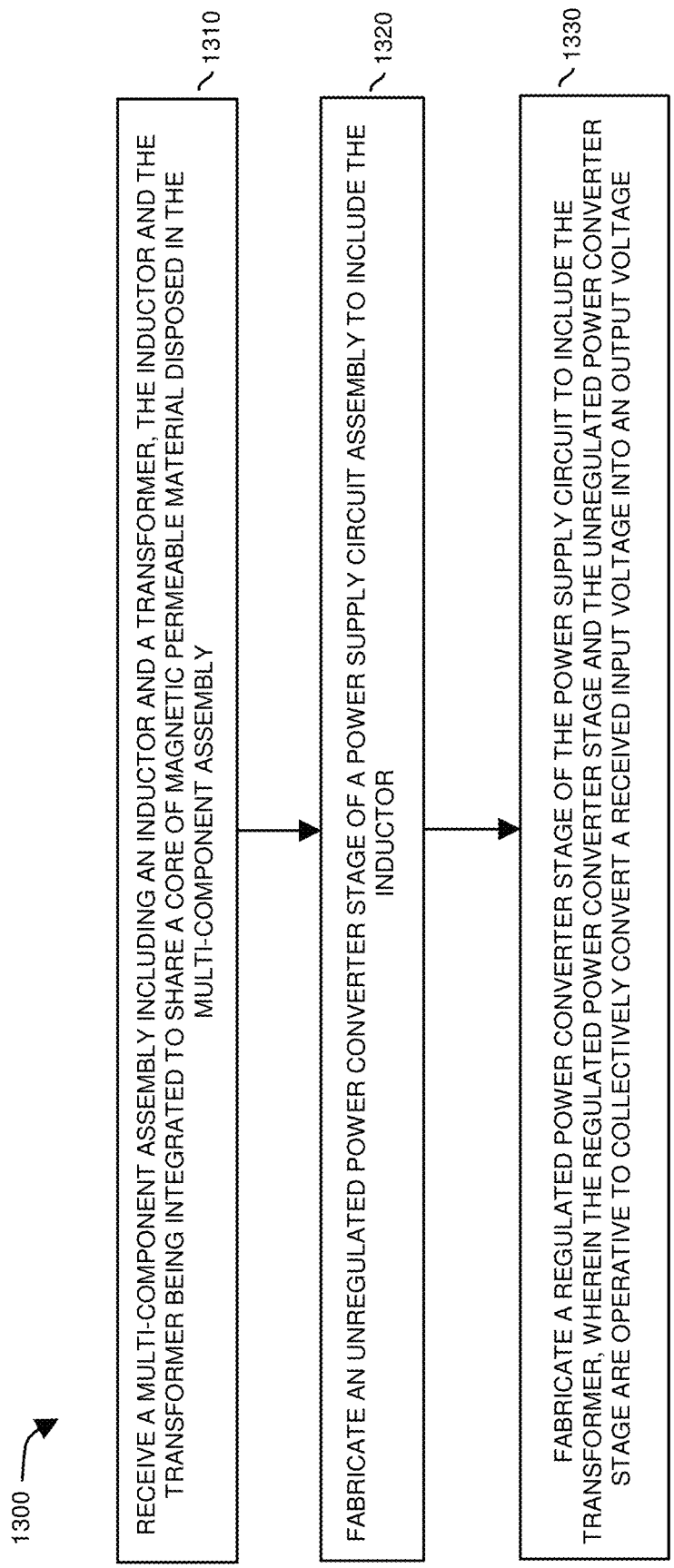

POWER SUPPLY AND INTEGRATED MAGNETIC ASSEMBLY IMPLEMENTATIONS

BACKGROUND

Data centers provide indispensable services for our society. The energy consumption for all data centers worldwide is around 2% of the whole amount of electric energy usage. Therefore, data center providers are continuously looking to improve the efficiency of power conversion in order to save energy or to be able to increase the CPU/GPU/ASIC, etc., power of servers in existing data centers. Machine learning and artificial intelligence require a high amount of energy for execution.

Higher voltage distribution and efficient conversion systems are typically implemented to reduce losses and increase the overall power density of a respective power conversion system. In the last few years, 48 VDC at rack level has been introduced by vendors enabling several different scenarios to provide high power to digital loads, such as CPU/ASIC/GPU. These architectures are coordinated, e.g., by the Open compute consortium, currently OCP 3.0 is the most modern architecture supporting 48 VDC distribution within the rack.

Modern microprocessors and ASICs require a low input voltage, typically 1 VDC or even lower (a goal is to reduce it down to 0.4 VDC) with high currents that can reach 1000 Amperes or more. In such applications, there are several attributes which are driving desirable solutions:

High power density: small footprint and low height allows to place the converter close to the load (i.e. ASIC or microprocessor), reducing therefore the PDN (Power Delivery Network) parasitic losses, enabling to power the load, e.g., from the bottom of the ASIC in an active substrate or interposer or from the side/bottom while being located on the CPU board itself.

Fast Transient Response and low Output Voltage ripple: ASIC and Microprocessors require extremely fast current transient which can reach 1000 Amps/µs and the system needs to keep the output voltage within a tight regulation. Specifically, voltage undershoots may lead to CPU failures. Moreover, low voltage ripple is required (typically less than 20 mV), therefore paralleling of phases is required.

High efficiency: firstly, efficiency is a key argument for the OPEX of data centers, secondly efficiency is a pre-requirement when moving the power stage close to the load to prevent additional heating.

Low EMI noise: due to the desired proximity of the power stage to the load (being located within an active substrate or below the CPU in an interposer) EMI disturbance needs to be avoided. This requires typically zero voltage switching and absence of air gaps in the magnetic structure to avoid any coupling between high frequency data lines and the power delivery paths.

Modern processors typically integrate an internal voltage regulator module (VRM), called a fully integrated voltage regulator module (or FIVR), to mitigate the requirement for the external VRM stage. FIVR modules require a considerable design and technology effort (currently only Intel™ owns this technology). Hence power conversion implemented as close as possible to the load such as via an ASIC/CPU/GPU creates value for all companies having no access to the FIVR technology.

A traditional buck solution is a good candidate to provide regulated power in such an application, because of its inherent potential to shrink the size of the inductor by increasing the switching frequency and reducing the input voltage of the buck converter, for a given power and transient requirement. However, the buck converter, sometimes implemented via a multi-phase approach, requires an inductor and transistor rated with the full input voltage. In this scenario, due to high power density requirement, low inductor losses are difficult to achieve. Furthermore, the core losses are load dependent, because of the dependency of the DC magnetic flux on the load. In order to mitigate the high DC and AC magnetic flux density a bigger inductance is needed, therefore the VRM module generally is placed on the side of the CPU or ASIC where the effect of the power delivery network (PDN) is a limiting factor in power capability and transient performance.

In recent years DC-DC switched-capacitor converters are useful for high-density point-of-load applications. In contrast to a buck converter, the switched-capacitor converter requires only capacitors and no inductors which have been demonstrated to increase dramatically the power density of the system. Unfortunately, a conventional switched-capacitor converter has two main drawbacks. For example, the switched-capacitor converter topology is an unregulated converter and requires many switches in order to have a ratio n higher than 2. To overcome this issue, a Hybrid Switched Capacitor (HSC) converter is a candidate as a step-down converter to supply power directly to a load. By combining the high-density capability of the classic switched-capacitor converter and the high-step down capability being provided by a respective magnetic components, the HSC converter is a good candidate for such an approach. Since the HSC is not providing output regulation, regulation has to be taken care for in an additional series-connected power stage.

It is further noted that conventional switching power supply circuits sometimes include an energy storage component such as an inductor or transformer to produce an output voltage that powers a load. For example, to maintain a magnitude of an output voltage within a desired range, a controller controls switching of current through one or more inductors to produce an output voltage that powers a load.

In general, a conventional inductor is a component comprising a wire or other conductive material, which is shaped as a coil or helix to increase an amount of magnetic flux through a respective circuit path. Winding a wire into a coil of multiple turns is useful because it increases the number of respective magnetic flux lines in a respective inductor component, increasing the magnetic field and thus overall inductance of the respective inductor component.

The combination of multiple magnetically coupled windings is called a transformer. In general, as is known in the art, the flow of current through a primary winding of a transformer causes a flow of current in a secondary winding of the transformer. As previously discussed, proper control of current through an inductor and/or transformer such as in a conventional hybrid switched-capacitor converter produces a respective output voltage.

BRIEF DESCRIPTION

Implementation of clean energy (or green technology) is very important to reduce our impact as humans on the environment. In general, clean energy includes any evolving methods and materials to reduce an overall toxicity of energy consumption on the environment.

This disclosure includes the observation that raw energy, such as received from green energy sources or non-green energy sources, typically needs to be converted into an appropriate form (such as desired AC voltage, DC voltage, etc.) before it can be used to power end devices such as servers, computers, mobile communication devices, etc. Regardless of whether energy is received from green energy sources or non-green energy sources, it is desirable to make most efficient use of raw energy provided by such systems to reduce our impact on the environment. This disclosure contributes to reducing our carbon footprint (and green energy) via more efficient energy conversion.

Additionally, this disclosure includes the observation that conventional discrete/disparate inductor and transformer components are typically suited for planar circuit applications in which a respective planar surface of a power supply circuit board is populated with multiple different components that are, in turn, coupled to each other via circuit traces disposed on the planar surface. Such topologies (providing horizontal power flow in the power supply circuit board) inevitably make it difficult to create a compact, efficient, and high current output power supply circuit. Thus, conventional power supply circuits implementing one or more inductors via windings are sometimes undesirable.

In contrast to conventional techniques, this disclosure includes novel and improved inductor components, inductor assemblies, circuit assemblies, etc.

More specifically, a power supply includes an assembly. The assembly may comprise an inductor and a transformer. The inductor and the transformer may be integrated to share a core of magnetic permeable material disposed in the assembly. The assembly may further include an unregulated power converter stage including the transformer. Yet further, the assembly may include a regulated power converter stage including the inductor. The regulated power converter stage and the unregulated power converter stage collectively produce an output voltage to power a load.

The unregulated power converter stage may include a switched-capacitor converter; a combination of the switched-capacitor converter and the transformer may produce the output voltage; and the regulated power converter stage may control a flow of current through the inductor to produce the output voltage. The unregulated power converter stage may generate an intermediate voltage supplied to the regulated power converter stage; the regulated power converter stage may produce the output voltage from the intermediate voltage.

The unregulated power converter stage may receive and convert a first input voltage into the output voltage; and the regulated power converter stage may receive and convert a second input voltage into the output voltage.

The assembly may include a partition fabricated from the magnetic permeable material in the magnetic core is operative to convey both first magnetic flux generated via flow of first current through a winding of the transformer and second magnetic flux generated via flow of second current through the inductor. Presence of the partition in the assembly magnetically decouples the inductor from the winding of the transformer.

The transformer may include a first winding and a second winding, the first winding magnetically coupled to the second winding; the inductor may include an inductor winding; and the magnetic permeable material of the assembly may include a first channel in which the first winding and the second winding reside, the first channel disposed between a first partition of the magnetic permeable material and a second partition of the magnetic permeable material in the assembly; the magnetic permeable material of the assembly may include a second channel in which the inductor winding resides, the second channel disposed between the second partition of the magnetic permeable material in the assembly and a third partition of the magnetic permeable material in the assembly. The first winding and the second winding may be wound around the first partition.

Note further that the core of the assembly fabricated from the magnetic permeable material may include a top portion (fabricated from the magnetic permeable material) and a bottom portion (fabricated from the magnetic permeable material). Each of the first partition, the second partition, and the third partition are disposed in the assembly between the top portion and the bottom portion. A first axial end of the second partition of the magnetic permeable material may contact the top portion; a second axial end of the second partition of the magnetic permeable material contacts the bottom portion. The assembly include: i) a first gap disposed between the top portion and the bottom portion, the first gap disposed in a first axial path extending through the top portion, the first partition, and the bottom portion; ii) a second gap disposed between the top portion and the bottom portion, the second gap disposed in a second axial path extending through the top portion, the second partition, and the bottom portion.

The transformer of the assembly may provide galvanic isolation between the unregulated power converter stage and the regulated power converter stage.

The input of the unregulated power converter stage may be connected in series with an input of the regulated power converter stage; and an output of the unregulated power converter stage may be connected in parallel with an output of the regulated power converter stage.

The core of the magnetic permeable material may include a sequence of multiple partitions including a first partition, a second partition, and a third partition disposed along an axis, each of the multiple partitions extending between a top portion of the core and a bottom portion of the core, each of the multiple partitions fabricated from the magnetic permeable material; the transformer may be fabricated from multiple transformer windings wound around the second partition; the first partition may be configured to convey magnetic flux generated by the multiple transformer windings and magnetic flux generated by the inductor; and the third partition can be configured to convey magnetic flux generated by the multiple transformer windings and magnetic flux generated by the inductor.

The inductor may include a winding that is directly coupled to a winding of the transformer to produce an output voltage.

The transformer may be an autotransformer.

The assembly as discussed herein may include a partition fabricated from the magnetic permeable material, the partition providing a separation between the transformer and the inductor.

The assembly may include: i) a first channel and a second channel, a winding of the inductor disposed in the first channel, a winding of the transformer disposed in the second channel; and ii) a partition fabricated from the magnetic permeable material, the partition disposed between the first channel and the second channel.

An assembly as discussed herein may include: a core of magnetic permeable material; an inductor fabricated at least in part from a first portion of the magnetic permeable material; a transformer fabricated at least in part from a second portion of the magnetic permeable material, the inductor magnetically decoupled from windings of the transformer; and wherein the core includes a partition fabricated from the magnetic permeable material, the partition operative to convey magnetic flux generated by the windings of the transformer and magnetic flux generated by the inductor.

A method as discussed herein may include: receiving a multi-component assembly including an inductor and a transformer, the inductor and the transformer being integrated to share a core of magnetic permeable material disposed in the multi-component assembly; fabricating an unregulated power converter stage of a power supply circuit assembly to include the inductor; fabricating a regulated power converter stage of the power supply circuit to include the transformer; and wherein the regulated power converter stage and the unregulated power converter stage are operative to collectively convert a received input voltage into an output voltage. The partition is operative to magnetically decouple the winding of the inductor from the winding of the transformer. The multi-component assembly may include partition fabricated from the magnetic permeable material in the magnetic core, the partition may be configured to convey both first magnetic flux generated via flow of first current through the windings of the transformer and second magnetic flux generated via flow of second current through the inductor.

These and other more specific examples are disclosed in more detail below.

Note that any of the resources (such as a fabricator) implemented in the system as discussed herein can include one or more computerized devices, controllers, mobile communication devices, handheld or laptop computers, or the like to carry out and/or support any or all of the method operations disclosed herein. In other words, one or more computerized devices or processors can be programmed and/or configured to operate as explained herein to carry out the different implementations as described herein.

Yet other implementations herein include software programs to perform the steps and operations summarized above and disclosed in detail below. The computer program product may include a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, implementations herein are directed to a method, system, computer program product, etc., that supports operations as discussed herein.

One example in this disclosure includes a fabricator such as including computer readable storage medium and/or system having instructions stored thereon to fabricate an inductor device. The instructions, when executed by computer processor hardware, cause the computer processor hardware (such as one or more co-located or disparately located processor devices or hardware) to: receive a multi-component assembly including an inductor and a transformer, the inductor and the transformer being integrated to share a core of magnetic permeable material disposed in the multi-component assembly; fabricate an unregulated power converter stage of a power supply circuit assembly to include the inductor; fabricate a regulated power converter stage of the power supply circuit to include the transformer; and wherein the regulated power converter stage and the unregulated power converter stage are operative to collectively convert a received input voltage into an output voltage.

The ordering of the steps above has been added for clarity sake. Note that any of the processing steps as discussed herein can be performed in any suitable order.

Other examples of the present disclosure include software programs and/or respective hardware to perform any of the method operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

Note further that although implementations as discussed herein are applicable to switching power supplies, the concepts disclosed herein may be advantageously applied to any other suitable topologies.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of implementations herein (BRIEF DESCRIPTION) purposefully does not specify every implementation and/or incrementally novel aspect of the present disclosure or claimed invention(s). Instead, this brief description only presents general implementations and corresponding points of novelty over conventional techniques. For additional details and/or possible perspectives (permutations) of the invention(s), the reader is directed to the Detailed Description section (which is a summary of implementations) and corresponding figures of the present disclosure as further discussed below.

BRIEF DESCRIPTION OF THE DRAWINGS

FIG. 3A is an example diagram illustrating connectivity of multiple windings in an assembly including a transformer and multiple inductor components.

FIG. 3B is a top view diagram of the assembly in FIG. 3A.

FIG. 3C is an example diagram illustrating a side view of the assembly shown in FIG. 3B.

FIG. 4A is an example diagram illustrating connectivity of multiple windings in an assembly including a transformer and multiple inductor components.

FIG. 4B is a top view diagram of the assembly in FIG. 4A.

FIG. 4C is an example diagram illustrating a side view of the assembly shown in FIG. 4B.

FIG. 8 is a three-dimensional diagram illustrating core of magnetic permeable material associated with a magnetic assembly.

FIG. 10A is an example diagram illustrating connectivity of multiple windings in an assembly including a transformer and multiple inductor components.

FIG. 10B is a physical top view diagram of the assembly in FIG. 10A.

FIG. 13 is an example diagram illustrating a method of fabricating an assembly.

Figure 1:
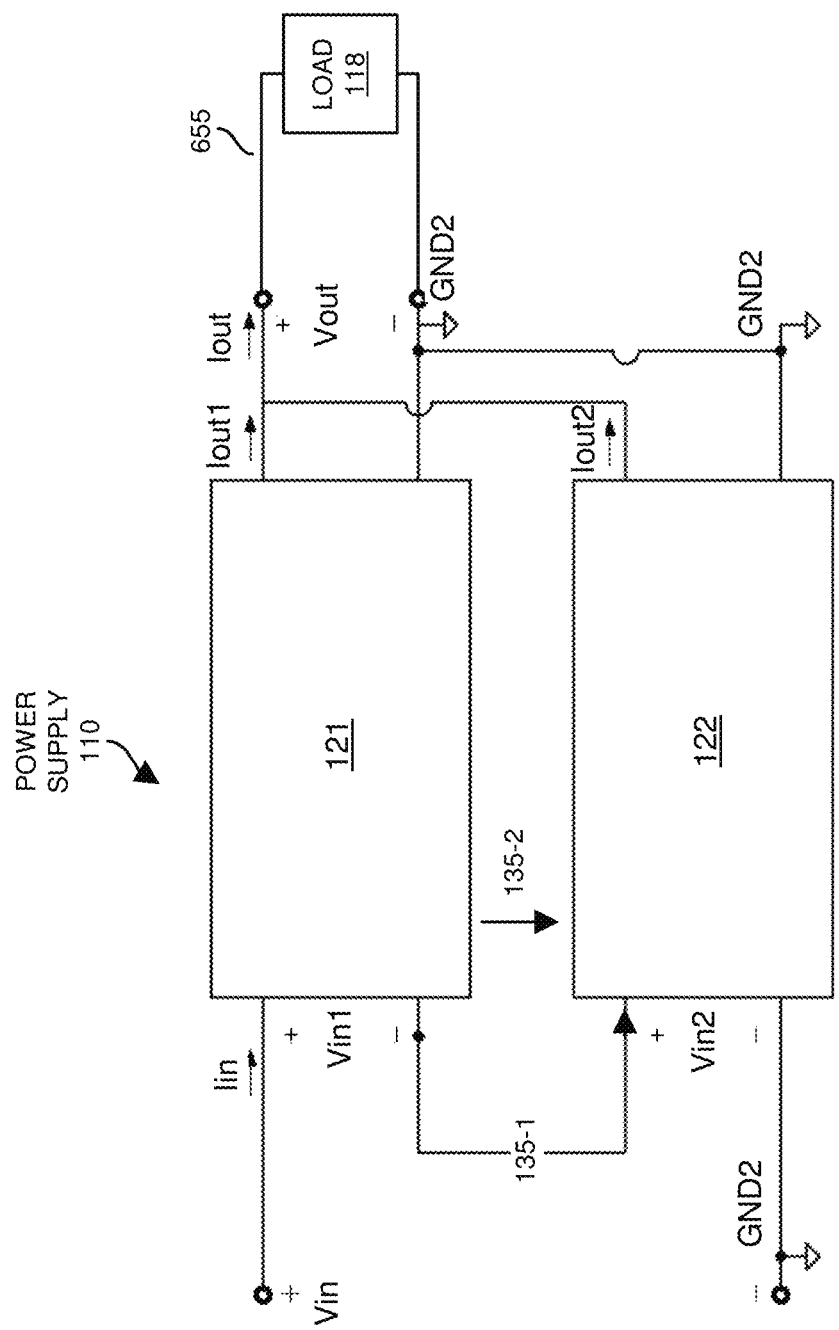
FIG. 1 is an example diagram illustrating a power converter.

The foregoing and other objects, features, and advantages of this disclosure will be apparent from the following more particular description herein, as illustrated in the accompanying drawings in which like reference characters refer to the same parts throughout the different views. The drawings are not necessarily to scale, with emphasis instead being placed upon illustrating the implementations, principles, concepts, etc.

DETAILED DESCRIPTION

It is noted that the main challenges for powering a load such as CPU/ASIC/GPU applications are:

High transient performance with symmetrical response both to load jump and load release High power density especially on the stage being coupled to the digital load Low output voltage with narrow voltage tolerance High output current Certain implementations herein focus on the integration of two or more magnetic components into a single one, or into more groups, for a particular family of power converters. These converters are a subset of the hybrid converter family. A new magnetic structure for two (or more) power converters which have one (or more) inductors and one (or more) transformers whose outputs are connected together. The novel assembly (a.k.a., magnetic structure) has at least one magnetic path shared between the transformer(s) and the inductor(s).

As discussed herein, inductor(s) and transformer(s) are integrated into a single magnetic assembly to improve power density and shorten the power path length from input to output.

A power supply includes an assembly comprising an inductor and a transformer. The inductor and the transformer are integrated to share use of a core of magnetic permeable material disposed in the assembly. The power supply further includes an unregulated power converter stage and a regulated power converter stage. The unregulated power converter stage includes use of the transformer. The regulated power converter stage includes use of the inductor. A combination of the regulated power converter stage and the unregulated power converter stage collectively produce an output voltage to power a load.

Now, with reference to the drawings, FIG. 1 is an example diagram illustrating a hybrid power converter.

As shown, the hybrid power converter 110 (power supply such as a Sigma converter) includes unregulated power converter stage 121 (i.e., an unregulated power converter) and regulated power converter stage 122 (i.e., a regulated power converter).

The hybrid power converter 110 combines the unregulated power converter stage 121 and the regulated power converter stage 122 to receive input voltage Vin and produce a respective output voltage Vout.

More specifically, the hybrid power converter 110 is connected in a so-called ISOP (Input Series Output Parallel) connection configuration in which the inputs (voltage Vin1 and voltage Vin2) are series connected and outputs are parallel connected to produce the output voltage Vout. Thus, an input of the unregulated power converter stage 121 may be connected in series with an input of the regulated power converter stage 122; an output of the unregulated power converter stage 121 is connected in parallel with an output of the regulated power converter stage 122 to power the dynamic load 118. Power converter stage 121 receives input voltage Vin and produces intermediate voltage 135-1 and 135-2 supplied to the power converter stage 122. Power converter stage uses the intermediate voltage 135-1 and intermediate voltage 135-2 to produce output current Iout2. The node 655 receives current Iout1 from the power converter stage 121 and current Iout2 from the power converter stage 122 to produce the output voltage Vout at node 655.

One desirable feature of the hybrid power converter 110 is that the reference potential GND2 of the regulating power converter 122 is identical with the reference GND2 of the output voltage Vout. Hence, the unregulated power converter stage 121 may use galvanic isolation and requires a transformer as further discussed below. In other words, the transformer 220 may provide galvanic isolation between the unregulated power converter stage 121 and the regulated power converter stage 122.

Figure 2:
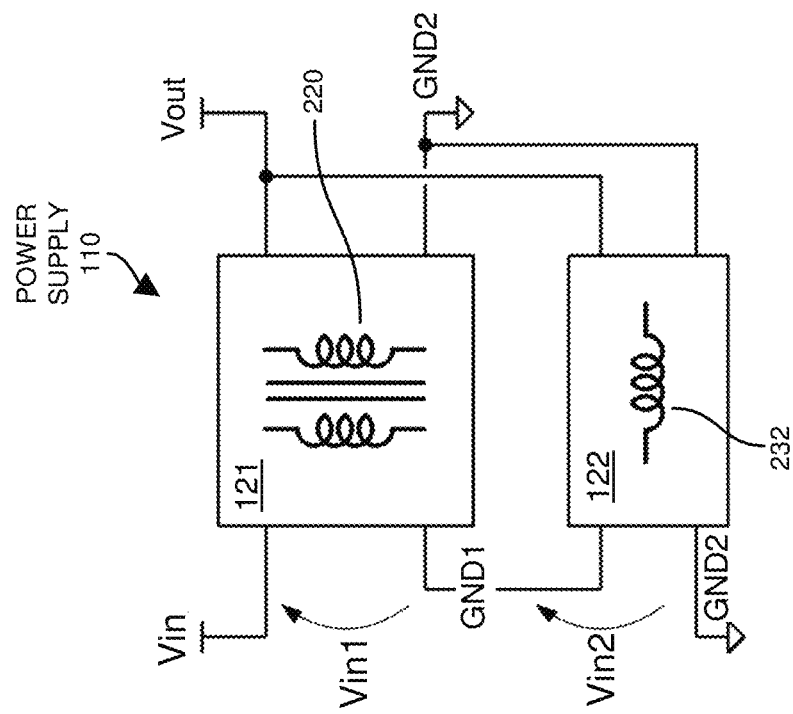
FIG. 2 is an example diagram illustrating a power converter and implementation of a transformer and a respective inductor to produce an output voltage.

FIG. 2 is an example diagram illustrating a power converter and implementation of a transformer and a respective inductor to produce an output voltage.

This disclosure includes a method to integrate one or more transformer components 220 and one or more inductor components 222 of a sigma converter into a single magnetic assembly.

As previously discussed, the hybrid power converter 110 includes two or more sub-converters in an ISOP configuration, where any converter can be isolated or non-isolated and any combination is possible, e.g. non-isolated with non-isolated, isolated with non-isolated, isolated with isolated.

An ISOP (sigma) connection can be useful to exploit the performance of hybrid converters.

In general, a hybrid converter can be considered as the combination of an unregulated converter, which implements one or more transformers to deliver energy, with a regulated counterpart, which implements one or more inductors to deliver energy. The main idea behind these topologies is to achieve higher efficiency and/or power density by sharing power delivery among the two: usually, the unregulated power converter stage 121 has higher efficiency but lacks regulation capability, while the regulated power converter stage 122 implements regulation capability with lower conversion efficiency performance.

Via this combination of different types of power converter stages, the overall efficiency associated with the hybrid 110 can be tailored by delivering most of the power to a respective load 118 powered by the output voltage Vout through the unregulated power converter stage 121, while only a fraction of the transferred power is provided to the load 118 via the regulated power converter stage 122.

As illustrated in FIG. 2, a transformer-based converter (for example unregulated power converter stage 121) and an inductor-based converter (for example regulated power converter stage 122) are implemented via an ISOP connection configuration.

When a hybrid converter relies on both magnetic components to operate (one or more transformers and one or more inductors), two or more magnetic circuits are commonly used to achieve coupling between the transformer windings and to implement the inductor. Usually, the transformer(s) and the inductor(s) are completely separate components, which can be discrete versions or integrate planar versions.

Depending on the topology, the hybrid power converter 110 can include magnetics used to implement transformers and/or inductors. The following FIGS. and corresponding text describe different possible implementations, which are based on a non-regulated, transformer-based converter in ISOP configuration with a regulated buck converter (non-isolated or isolated). The first block is therefore using a transformer, the latter an inductor.

FIG. 3A is an example diagram illustrating connectivity of multiple windings in an assembly including a transformer and multiple inductor components.

In this example, the winding 221 (any integer or non-integer number of turns) associated with the transformer 220 extends between the node N1 and node N2.

The winding 222 (any integer or non-integer number of turns) associated with the transformer 220 extends between the node N3 and node N4. The winding 221 is magnetically coupled to winding 222.

Inductor winding 232-1 (winding $W_{L,1}$) is connected between node 242 and node 250 (COM). Inductor winding 232-2 (winding $W_{L,2}$) is connected between node 242 and node 250 (COM).

If desired, the inductor winding 232-1 and inductor winding 232-2 are magnetically coupled to each other or magnetically coupled to the windings 221 and 222 of the transformer 220. Alternatively, the windings 232-1 and winding 232-2 are not magnetically coupled to each other or windings 221 and 222.

FIG. 3B is a top cutaway view diagram of the assembly in FIG. 3A.

As shown, the assembly 310 includes multiple partitions fabricated from magnetic permeable material 389. The partitions (such as columns or other suitable shape) create multiple channels.

More specifically, the assembly 310 includes partition 351, partition 352, partition 353, partition 354, and partition 355. The channel C1 (i.e., void) resides between partition 351 and partition 352. The channel C2 resides between the partition 351 and partition 353. The channel C3 resides between partition 352 and partition 354. The channel C4 resides between the partition 353 and partition 355.

As further shown, the winding 221 is fabricated from electrically conductive material such as metal or other suitable material and is wrapped around partition 351 through channel C1 and C2. The winding 222 fabricated from electrically conductive material such as metal or other suitable material is wrapped around partition 351 through channel C1 and C2 as well.

The inductor winding 232-1 is fabricated from electrically conductive material such as metal or other suitable material and passes through the channel C3 between partition 352 and partition 354. The inductor winding 232-2 fabricated from electrically conductive material such as metal or other suitable material passes through the channel C4 between partition 353 and partition 355. The assembly 310 includes one or more partitions fabricated from the magnetic permeable material, the partitions provide a separation between the transformer and the inductor.

FIG. 3C is an example diagram illustrating a side view of the assembly shown in FIG. 3B.

In this example, the assembly 310 includes a top plate 391 (a.k.a., top portion of magnetic permeable material 389) and a bottom plate 392 (a.k.a., bottom portion of magnetic permeable material 389) fabricated from magnetic permeable material 389.

The partitions extend completely or partially between the template 391 and the bottom plate 392. For example, one or more of the partitions 351, 352, 353, 354, and 355 can be configured to extend in a continuous manner between the bottom plate 392 and the top plate 391 of assembly 310. If desired, one or more of the partitions 351, 352, 353, 354, 355, can include a respective air gap between the partition and the top plate 391 or the bottom plate 392. Thus, each partition can be configured to include a respective gap or provide continuous connectivity of magnetic permeable material between the top plate 391 and the bottom plate 392.

As further shown, the partition 352 is operative to magnetically decouple the winding associated with inductor winding 232-1 from the windings 221 and 222 of the transformer 220. For example, the magnetic permeable material 389 associated with the partition 351, partition 352, top plate, and bottom plate support (according to the right hand rule) magnetic flux 371 associated with current through the one or more windings w1 and w2 in channel C1. The magnetic permeable material associated with the partition 352, partition 354, top plate, and bottom plate support magnetic flux 372 associated with current through winding of inductor 232-1.

Additionally, note again that the partition 352 fabricated from the magnetic permeable material 389 in the magnetic core (top plate, bottom plate, and partitions) conveys both first magnetic flux 371 generated via flow of first current through the windings of the transformer 220 and second magnetic flux 372 generated via flow of second current through the one or more inductor windings. In this configuration, the partition 352 is operative to magnetically decouple the winding associated with inductor 232-1 from the windings 221 and 222 of the transformer 220.

As further shown, the partition 353 is operative to magnetically decouple the winding associated with winding of inductor 232-2 from the windings 221 and 222 of the transformer 220. For example, the magnetic permeable material associated with the partition 351, partition 353, top plate, and bottom plate support (according to the right hand rule) magnetic flux 373 associated with current through the one or more windings w1 and w2. The magnetic permeable material associated with the partition 353, partition 355, top plate, and bottom plate support magnetic flux 374 associated with current through winding of inductor 232-2.

Additionally, note again that the partition 353 fabricated from the magnetic permeable material 389 in the magnetic core of assembly 310 conveys both first magnetic flux 373 generated via flow of first current through the windings of the transformer and second magnetic flux 374 generated via flow of second current through the inductor. The partition 353 is operative to magnetically decouple the winding associated with inductor 232-2 from the windings to 221 and 222 of the transformer 220.

Partition 351 provides magnetic or inductive coupling between the winding w1 and winding w2.

The shared use of the partition 352 and partition 353 to support magnetic flux from both the transformer windings and the inductor windings enables a smaller sized magnetic component assembly for implementing the hybrid power converter as discussed herein. For example, as previously discussed, the core of magnetic permeable material associated with assembly 310 includes a sequence of multiple partitions 351, 352, 353, 354, and 355 disposed along an axis; each of the multiple partitions extends between a top portion 391 of the core and a bottom portion 392 of the core (with or without a gap), each of the multiple partitions is fabricated from the magnetic permeable material. The transformer 220 is fabricated from multiple transformer windings wound around the partition 351. The partition 352 conveys magnetic flux 371 generated by current through the multiple transformer windings and magnetic flux 372 generated by the one or more inductor winding 232-1. The partition 352 conveys magnetic flux 373 generated by the multiple transformer windings and magnetic flux 374 generated by the inductor winding 232-2.

Thus, FIG. 3A illustrates the equivalent magnetic circuit associated with the assembly 310, while FIGS. 3B and 3C illustrate a possible magnetic implementation. Such an implementation can be used for the Sigma converter (power supply or hybrid power converter 110) concept of FIG. 2, such as in an ISOP converter, where the first converter 121 is an isolated converter and the second converter 122 is a non-isolated converter, the inductor-based converter. $w_1$ and $w_2$ are wrapped around the center column (partition 351), and their turns (windings w1 and w2) can be an integer or non-integer number. As further shown, winding associated with inductor 232-1 ($w_{L,1}$) and winding associated with inductor 232-2 ($w_{L,2}$) are wrapped around the outer columns (partition 354 and partition 355) and the inner columns (partition 352 and partition 353) and are shared with the autotransformer outer legs. These inductors can be part of a non-isolated or isolated converter.

FIG. 4A is an example diagram illustrating connectivity of multiple windings in an assembly including a transformer and multiple inductor components.

The winding 421 (any integer or non-integer number of turns) associated with the transformer 420 extends between the node N1 and node N2.

The winding 422-1 (any integer or non-integer number of turns) associated with the transformer 420 extends between the node N3 and node COM. The winding 422-2 (any integer or non-integer number of turns) associated with the transformer 420 extends between the node N4 and node COM. The winding 421 is magnetically coupled to winding 422-1 and winding 422-2.

Inductor winding 432-1 is connected between node 442-1 and node 450 (COM). Inductor winding 432-2 is connected between node 442-2 and node 450 (COM).

If desired, the inductor winding 432-1 and inductor winding 432-2 are magnetically coupled to each other or are magnetically coupled to one or more of the windings 421, 422-1, and 422-2 of the transformer 420. Alternatively, the windings 432-1 and winding 432-2 are not magnetically coupled to each other or windings of the transformer.

FIG. 4B is a top cutaway view diagram of the assembly in FIG. 4A.

As shown, the assembly 410 includes multiple partitions fabricated from magnetic permeable material 489. The partitions (such as columns or other suitable shape) create multiple channels.

More specifically, the assembly 410 includes partition 451, partition 452, partition 453, partition 454, and partition 455. The channel C1 resides between partition 451 and partition 452. The channel C2 resides between the partition 451 and partition 453. The channel C3 resides between partition 452 and partition 454. The channel C4 resides between the partition 453 and partition 455.

As further shown, the winding 421 is fabricated from electrically conductive material such as metal or other suitable material and is wrapped around partition 451 through channel C1 and C2. The winding 422-1 (w1) fabricated from electrically conductive material such as metal or other suitable material is wrapped around partition 451 through channel C1 and C2 as well. The winding 422-2 (w2) fabricated from electrically conductive material such as metal or other suitable material is wrapped around partition 451 through channel C1 and C2 as well.

The inductor winding 432-1 is fabricated from electrically conductive material such as metal or other suitable material and passes through the channel C3 between partition 452 and partition 454. The inductor winding 432-2 is fabricated from electrically conductive material such as metal or other suitable material and passes through the channel C4 between partition 453 and partition 455.

FIG. 4C is an example diagram illustrating a side view of the assembly shown in FIG. 4B.

In this example, the assembly 410 includes a top plate 491 and a bottom plate 492, both of which are fabricated from magnetic permeable material 489 similar to the respective partitions.

Note that each of the partitions can be configured to extend completely or partially between the template 491 in the bottom plate 492. For example, one or more of the partitions 451, 452, 453, 454, and 455 can be configured to extend in a continuous manner between the bottom plate 492 and the top plate 491 of assembly 410. If desired, one or more of the partitions 451, 452, 453, 454, 455, can include a respective air gap between the partition and the top plate 491 or the bottom plate 492. Thus, each partition can be configured to include a respective gap or provide continuous magnetic permeable material between the top plate the bottom plate.

As further shown, the partition 452 is operative to magnetically decouple the winding associated with inductor winding 432-1 from the windings to 421, 422-1, and 422-2 of the transformer 420. For example, the magnetic permeable material associated with the partition 451, partition 452, top plate, and bottom plate support (according to the right hand rule) magnetic flux 471 associated with current through the one or more windings w1, w2, and w3 in channel C1 and channel C2. The magnetic permeable material associated with the partition 452, partition 454, top plate, and bottom plate support magnetic flux 372 associated with current through winding of inductor 432-1.

Thus, the partition 452 is operative to magnetically decouple the winding associated with inductor 432-1 from the windings 421, 422-1, and 422-2, in channel C1. Additionally, note again that the partition 452 fabricated from the magnetic permeable material 489 in the magnetic core (top plate, bottom plate, and partitions) conveys both first magnetic flux 471 generated via flow of first current through the windings of the transformer 420 and second magnetic flux 472 generated via flow of second current through the inductor winding 432-1.

As further shown, the partition 453 is operative to magnetically decouple the winding associated with inductor winding 432-2 from the windings 421, 422-1, and 422-2 of the transformer 220. For example, the magnetic permeable material associated with the partition 451, partition 453, top plate, and bottom plate support (according to the right hand rule) magnetic flux 473 associated with current through the one or more windings w1, w2, and w3. The magnetic permeable material 489 associated with the partition 453, partition 455, top plate 491, and bottom plate 492 support magnetic flux 474 associated with current through winding of inductor 432-2.

Thus, the partition 453 is operative to magnetically decouple the winding associated with inductor 432-2 from the windings to 421, 422-1, and 422-2 of the transformer 420. Additionally, note again that the partition 453 fabricated from the magnetic permeable material 489 in the magnetic core of assembly 410 conveys both first magnetic flux 473 generated via flow of first current through the windings of the transformer and second magnetic flux 474 generated via flow of second current through the inductor.

Partition 451 provides magnitude or inductive coupling between the windings w1, w2, and w3.

The shared use of the partition 452 and partition 453 to support magnetic flux from both the transformer windings and the inductor windings (without coupling) enables a smaller sized magnetic component assembly for implementing the hybrid power converter as discussed herein.

FIGS. 4A, 4B, and 4C show an example of isolated transformer built in a center-tapped configuration where the output node is shared with one or more inductors. FIG. 4A shows the electric circuit whilst FIG. 4B illustrates a possible magnetic implementation of such concept. It can be noticed that the two inductors are built using a part of the magnetic structure used for the center-tapped transformer wherein $w_2$, $w_3$, $w_{L1}$ and $w_{L2}$ have one common node shorted. Such implementation can be used for Sigma converter (such as hybrid switched-capacitor converter as previously discussed) so as in an ISOP converter where the first converter is an isolated converter and the second is a non-isolated converter inductor based. $w_1$, $w_2$ and $w_3$ are wrapped around the center column where the turns can be integer on not integer number. $w_{L,1}$ and $w_{L,2}$ are wrapped around the outer column wherein one column is shared with the center-tapped autotransformer for each inductor. $w_{L,1}$ and $w_{L,2}$ can be also the output inductors of one or more regulated isolated converter so as the Sigma converter can be made with both converter isolated.

Figure 5A:
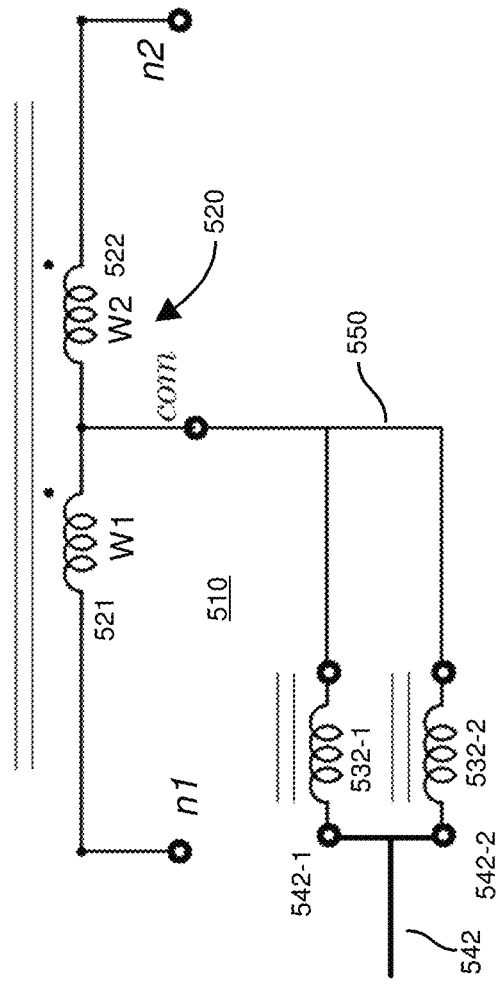
FIG. 5A is an example diagram illustrating connectivity of multiple windings in an assembly including a transformer and multiple inductor components.

FIG. 5A is an example diagram illustrating connectivity of multiple windings in an assembly including a transformer and multiple inductor components.

The winding 521 (any integer or non-integer number of turns) associated with the transformer 520 may extend between the node N1 and node COM. The winding 521 (any integer or non-integer number of turns) associated with the transformer 520 extends between the node N2 and node COM. The winding 521 is magnetically coupled to winding 522.

Inductor winding 532-1 is connected between node 542-1 and node 550 (COM). Inductor winding 532-2 is connected between node 542-2 and node 550 (COM).

If desired, the inductor winding 532-1 and inductor winding 532-2 are magnetically coupled to each other or are magnetically coupled to one or more of the windings 521, 521, and 522 of the transformer 520. Alternatively, the windings 532-1 and winding 532-2 are not magnetically coupled to each other or other windings w1 or w2.

Figure 5B:
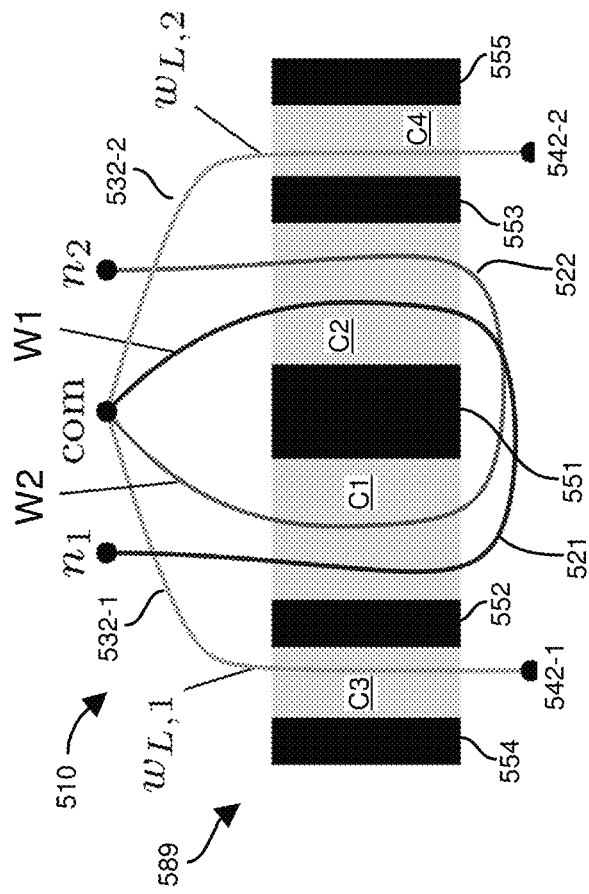
FIG. 5B is a top view diagram of the assembly in FIG. 5A.

FIG. 5B is a top cutaway view diagram of the assembly in FIG. 4A.

As shown, the assembly 510 includes multiple partitions fabricated from magnetic permeable material 589. The partitions (such as columns or other suitable shape) create multiple channels.

More specifically, the assembly 510 includes partition 551, partition 552, partition 553, partition 554, and partition 555. The channel C1 resides between partition 551 and partition 552. The channel C2 resides between the partition 551 and partition 553. The channel C3 resides between partition 552 and partition 554. The channel C4 resides between the partition 553 and partition 555.

Note that one or more of the partitions can be configured to extend between a respective top plate and bottom plate of the assembly 510. Additionally, or alternatively, there can be a respective gap between one or more of the partitions and the top plate and bottom plate of the assembly 510.

As further shown, the winding 521 is fabricated from electrically conductive material such as metal or other suitable material and is wrapped around partition 551 through channel C1 and C2. The winding 522 is fabricated from electrically conductive material such as metal or other suitable material and is wrapped around partition 551 through channel C1 and C2.

The inductor winding 532-1 is fabricated from electrically conductive material such as metal or other suitable material and passes through the channel C3 between partition 552 and partition 554. The inductor winding 532-2 is fabricated from electrically conductive material such as metal or other suitable material and passes through the channel C4 between partition 553 and partition 555.

In this example, the assembly 510 includes an autotransformer in which the output node (COM) is shared with one or more inductors 532-1 and 532-2. The electric circuit associated with the assembly 510 is shown in 5A; the top view of the assembly 510 is shown in FIG. 5B. It should be noted that the two inductors can be implemented using a part of the magnetic structure used for the autotransformer wherein $w_2$, $w_1$, $w_{L1}$ and $w_{L2}$, which have one common node shorted to COM. Such an implementation can be used for Sigma converter so as in an ISOP converter, where both first and second converter are non-isolated. $w_1$ and $w_2$ and are wrapped around the center column with turns that can be integer on not integer number. $w_{L,1}$ and $w_{L,2}$ are wrapped around the outer column wherein one column is shared with the center-tapped autotransformer for each inductor. $w_{L,1}$ and $w_{L,2}$ can be also the output inductors of one or more regulated isolated converter.

Figure 6:
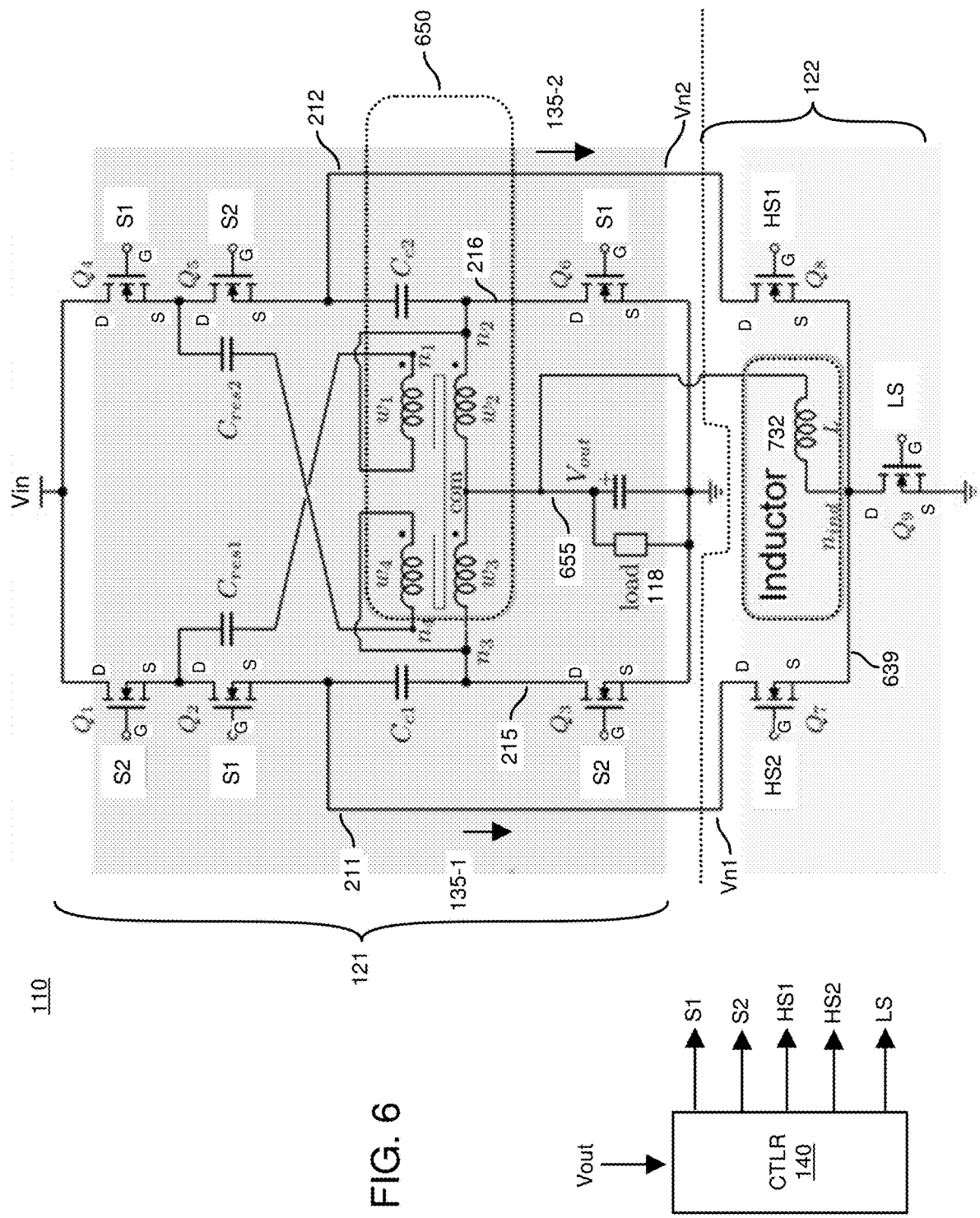
FIG. 6 is an example circuit diagram illustrating a power converter implementing a transformer and an inductor.

FIG. 6 is an example diagram illustrating a hybrid power converter.

In this example configuration, the hybrid power converter 110 includes unregulated power converter 121 (such as a hybrid switched-capacitor converter) and a regulated power converter 122 (such as a buck converter). The power converter 122 provides voltage regulation of the output voltage Vout via intermediate voltage 135-1 and intermediate voltage 135-2, each of which represents a fraction of the input voltage Vin. With respect to FIG. 1, see power converter stage 122 receiving intermediate voltage 135-1 and intermediate voltage 135-2 generated by the power converter stage 121. Also, see node 655 receiving a first portion of current from the first power converter stage 121 (specifically see com node) and output current from the inductor 732 to the node 655.

Referring again to FIG. 6, one advantage of the proposed topology of the hybrid power converter 110 is to provide very high efficiency by the unregulated power converter 121 and to provide output voltage Vout regulation capability using only a fraction (intermediate voltage 135-1 and intermediate voltage 135-2) of the input voltage Vin via the regulated power converter 122.

Thus, as shown, the example hybrid power converter 110 includes voltage source Vin, power converter 121, and power converter 122.

The power converter 121 (apparatus such as hardware, circuitry, etc.) includes multiple switches Q1, Q2, Q3, Q4, Q5, and Q6 (such as field effect transistors or any other suitable type of switch). Additionally, the power converter 121-1 (such as switched-capacitor converter) includes multiple circuit components including capacitor Cres1 and capacitor Cres2.

Further in this example, the multi-tapped autotransformer 650 of the power converter 121 includes primary winding W1 (such as N1 turns), primary winding W4 (such as N1 turns), secondary winding W2 (such as N2 turns), and secondary winding W3 (such as N2 turns). The number of windings (N1, N2, etc.) associated with the primary windings and/or the secondary windings can be any suitable value and vary.

A combination of the primary windings and secondary windings of multi-tapped autotransformer 650 are connected in series. For example, primary winding W1 is connected in series with secondary winding W2; secondary winding W2 is connected in series with secondary winding W3; secondary winding W3 is connected in series with primary winding W4.

The secondary windings (such as a tapped secondary winding, or multiple secondary windings connected in series) is inductively coupled to the primary windings. In other words, as shown, the first primary winding W1, the second primary winding W4, and the secondary winding(s) W2 and W3 are magnetically coupled to each other. If desired, the secondary windings W2 and W3 can be a center tapped winding facilitating generation of the output voltage Vout from a respective output node 655 (node COM) of the center-tapped winding.

Further in this example, the drain node (D) of switch Q1 and the drain node (D) of switch Q4 are connected to the input voltage source Vin.

Further, the source node (S) of the switch Q1 is coupled to the drain node (D) of the switch Q2 (node 213). The source node (S) of the switch Q4 is coupled to the drain node (D) of the switch Q5 (node 214). The source node (S) of the switch Q2 is coupled to node 211 (a.k.a., node VN1). The source node (S) of the switch Q5 is coupled to node 212 (a.k.a., VN2).

Capacitor Cres1 is connected between node 213 and a respective node n1 of primary winding W4. Capacitor Cres2 is connected between node 214 and a respective node n4 of primary winding W1.

The drain (D) of switch Q3 is connected to node 215 (a.k.a., node n3); the source (S) of switch Q3 is connected to ground. The drain (D) of switch Q6 is connected to node 216 (a.k.a., node n2); the source (S) of switch Q6 is connected to ground potential.

Capacitor Cc1 is connected between node 211 and node 215. Capacitor Cc2 is connected between node 212 and node 216.

The center tap node 655 (com or common node) of the secondary winding outputs current and corresponding output voltage Vout to drive load 118 (a.k.a., Ro).

The magnitude of the output voltage Vout is Vin/8. Thus, if Vin=48 VDC, the magnitude of the output voltage Vout is 6 VDC. However, as discussed herein, settings of components in the hybrid power converter 110 can be adjusted to produce an output voltage Vout of any suitable value.

In general the output voltage Vout=Vin*(N2/(2*(2N2+N1))), where N1=the number of turns on the primary windings of transformer 650 and N2 is the number of turns on each of the secondary windings of transformer 650.

Further in this example, control signal S2 generated by the controller 140 drives gates (G) of respective switches Q1, Q3, and Q5. Accordingly, control signal S2 controls a state of each of the switches Q1, Q3, and Q5.

Control signal S1 drives respective gates (G) of switches Q2, Q4, and Q6. Accordingly, control signal S1 controls a state of each of the switches Q2, Q4, and Q6.

Note that each of the switches as described herein can be any suitable devices such as (Metal Oxide Semiconductor) field effect transistors, bipolar junction transistors, etc.

The settings of capacitors Cres1 and Cres2 can be any suitable value. The hybrid power converter 110 as described herein may provide better performance when Cres1=Cres2, and works well even if Cres1≠Cres2.

As previously discussed, switches in power converter 121 are divided into two switch groups: the first switch group including switches Q1, Q3, and Q5 controlled by respective control signal S1, and a second switch group including switches Q2, Q4, and Q6, controlled by respective control signal S2, which is generally a 180 degrees phase shift with respect to timing of control signal S1.

The pulse width modulation of control signals S1 and S2 may be approximately 50% to obtain the minimum RMS current.

The magnitude of the output voltage Vout depends on the turns (# of windings ratio N1/N2 of the primary winding to the secondary winding). The switching frequency may not change directly the magnitude of the output voltage, but in general is changing it because the losses are increasing or decreasing based on the difference between Fres and Fsw, where Fres is the resonant frequency of the tank formed by Cres 1 or Cres2 and the leakage of the multi-tapped autotransformer when Cres1=Cres2.

Note further that one enabler of high efficiency and high-power density of the proposed hybrid power converter 110 is the ability to implement lower voltage rating field effect transistors and the implementation of Class II ceramic capacitors (such as capacitors Cres1 and Cers2), which inherently offer high capacitance density.

As further shown, the hybrid power converter 110 includes power converter 122. Power converter 122 (such as a buck converter) includes switches Q7, Q8, and Q9.

The switch Q8 (first high side switch circuitry) is connected between node 212 and node 639; the switch Q7 (second high side switch circuitry) is connected between node 211 and node 639. Switch Q9 (such as low side switch circuitry) is connected between node 639 and a respective ground potential. The corresponding inductor 732 is connected between node 639 and the center tap node 655 (common) of the transformer 650.

During operation, the controller 140 monitors a magnitude of the output voltage Vout and controls the flow of current through the inductor 732 to the dynamic load 118 such that the magnitude of the output voltage Vout is regulated at a desired reference setpoint voltage. As previously discussed, a first portion of the power supplied by the output voltage Vout to the dynamic load 118 is provided by the unregulated power converter 121; a second portion of the power supplied by the output voltage Vout to the dynamic load is provided by the regulated power converter 122.

Figures 7A, 7B:
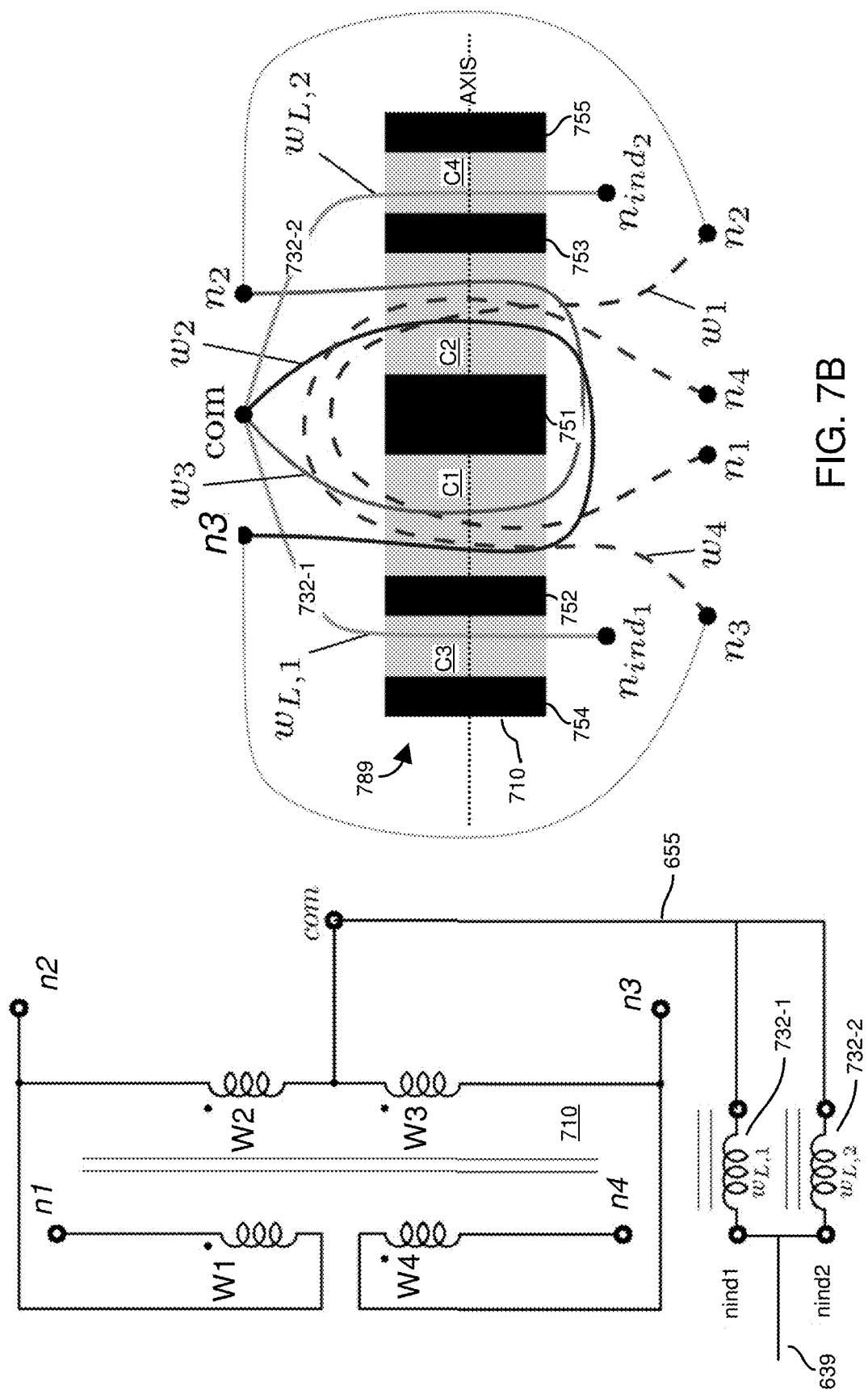
FIG. 7A is an example diagram illustrating connectivity of multiple windings in an assembly including a transformer and multiple inductor components.
FIG. 7B is a top view diagram of the assembly in FIG. 7A.

As further discussed herein, the transformer 650 (such as an autotransformer) and inductor winding 732 (such as one or more windings) can be implemented in an assembly 710 in FIGS. 7A and 7B. The inductor and the transformer can be integrated to share a core of magnetic permeable material disposed in the assembly 710. One or more inductor winding component may be directly coupled to one or more winding of the transformer 650 via the node 655 (COM).

Referring again to FIG. 6, the example hybrid power converter 110 includes the assembly 710 comprising an inductor 732 and a transformer 650. The hybrid power converter 110 further includes: i) an unregulated power converter stage 121 (such as hybrid switched-capacitor converter) including the transformer 650, ii) a regulated power converter stage 122 including the inductor 732. As previously discussed, the regulated power converter stage 122 and the unregulated power converter stage 121 collectively produce the output voltage Vout to power a load 118.

The unregulated power converter stage 121 generates an intermediate voltage 135-1 at node 211 supplied to the regulated power converter stage 122; the regulated power converter stage 122 produces the output voltage Vout from the intermediate voltage 135-1 via switching of switches Q7 and Q9 in a manner as previously discussed (such as via buck converter control operation). Additionally, the unregulated power converter stage 121 generates an intermediate voltage 135-2 at node 212 supplied to the regulated power converter stage 122; the regulated power converter stage 122 produces the output voltage Vout from the intermediate voltage 135-2 via switching of switches Q8 and Q9 in a manner as previously discussed. Thus, the unregulated power converter stage 121 is operative to receive and convert a first input voltage Vin into the output voltage Vout; the regulated power converter stage 122 is operative to receive and convert the second input voltage(s) (intermediate voltage 135-1 and/or intermediate voltage 135-2) into the output voltage Vout.

FIG. 7A is an example diagram illustrating connectivity of multiple windings in an assembly including a transformer and multiple inductor components.

The assembly 710 includes a transformer 650 and one or more inductors. For example, the winding w1 (any integer or non-integer number of turns) associated with the transformer 650 extends between the node n1 and node n2. The winding w4 (any integer or non-integer number of turns) associated with the transformer 650 extends between the node n4 and node n3. The winding w2 (any integer or non-integer number of turns) associated with the transformer 650 extends between the node n3 and node COM. The winding w3 (any integer or non-integer number of turns) associated with the transformer 650 extends between the node n2 and node COM.

Inductor winding 732-1 is connected between node 639 and node 655 (COM). Inductor winding 732-2 is connected between node 639 and node 655 (COM). These windings are connected in parallel.

If desired, the inductor winding 732-1 and inductor winding 732-2 are magnetically coupled to each other. Alternatively, the inductor winding 732-1 and inductor winding 732-2 are not magnetically coupled to each other.

FIG. 7B is a top cutaway view diagram of the logical view of assembly 710 in FIG. 7A.

As shown, the assembly 710 includes multiple partitions fabricated from magnetic permeable material 789. The partitions (such as columns or other suitable shape) associated with the assembly 789 create multiple channels.

More specifically, the assembly 710 includes partition 751, partition 752, partition 753, partition 754, and partition 755. The channel C1 resides between partition 751 and partition 752. The channel C2 resides between the partition 751 and partition 753. The channel C3 resides between partition 752 and partition 754. The channel C4 resides between the partition 753 and partition 755.

Note that one or more of the partitions in the assembly 710 can be configured to extend between a respective top plate (a.k.a., top portion) of magnetic permeable material 789 and a bottom plate (a.k.a., top portion) of magnetic permeable material 789 associated with assembly 710. Additionally, or alternatively, in a similar manner as previously discussed, there can be a respective gap between one or more of the partitions and the top plate and bottom plate of the assembly 710.

As further shown, the winding w1 is fabricated from electrically conductive material such as metal or other suitable material and is wrapped around partition 751 through channel C1 and C2 between node n1 and node n2. The winding w4 is fabricated from electrically conductive material such as metal or other suitable material and is wrapped around partition 751 through channel C1 and C2 between node n3 and node n4.

Additionally, the winding w2 is fabricated from electrically conductive material such as metal or other suitable material and is wrapped around partition 751 through channel C1 and C2 between node n3 and node COM. The winding w3 is fabricated from electrically conductive material such as metal or other suitable material and is wrapped around partition 751 through channel C1 and C2 between node n2 and node COM.

The inductor winding 732-1 is fabricated from electrically conductive material such as metal or other suitable material and passes through the channel C3 between partition 752 and partition 754. The inductor winding 732-2 is fabricated from electrically conductive material such as metal or other suitable material and passes through the channel C4 between partition 753 and partition 755.

Thus, the assembly 710 includes one or more partitions fabricated from the magnetic permeable material 789; the partitions provide a separation between the transformer 650 and the inductor 732.

Thus, FIG. 7A and FIG. 7B illustrate an example of multi-tapped autotransformer wherein the output node is shared with one or more inductors. As previously discussed, FIG. 7A is a logical electric circuit associated with the assembly 710; FIG. 7B is a physical magnetic implementation of the assembly 710. It can be noticed that the two inductors are built using a part of the magnetic structure used for the multi-tapped autotransformer wherein $w_2$, $w_3$, $w_{L1}$ and $w_{L2}$ have one common node shorted. Such implementation can be used for Sigma converter so as in an ISOP converter where both first and second converter are non-isolated. $w_1$, $w_2$, $w_3$, $w_4$ are wrapped around the center column with turns that can be integer on not integer number. $w_{L,1}$ and $w_{L,2}$ are wrapped around the outer column wherein one column is shared with the center-tapped autotransformer for each inductor. $w_{L,1}$ and $w_{L,2}$ can be also the output inductors of one or more regulated isolated converter.

FIG. 8 is a three-dimensional diagram illustrating core of magnetic permeable material associated with a magnetic assembly.

As shown, the core of magnetic permeable material includes multiple partitions as well as forming multiple channels between bottom plate 891 (a.k.a., bottom portion of magnetic permeable material 889) and top plate 892 (a.k.a., top portion of magnetic permeable material 889). Note that the top plate 892 is moved aside to illustrate the configuration of partitions and channels in the core of magnetic permeable material 889.

For example, a space between partition P1 and partition P3 forms channel C11. A space between partition P2 and partition P3 forms channel C12. A space between partition P1 and partition P2 forms channel C16.

A space between partition P3 and partition P4 forms a first portion of channel C13. A space between partition P3 and partition P5 forms a second portion of channel C14. A space between partition P4 and partition P5 forms channel C15.

As previously discussed, when the top plate 892 is disposed in parallel directly over the bottom plate 891 with the partitions disposed therebetween, the partitions can extend continuously between the bottom plate 891 and the top plate 892. Alternatively, the top plate 892 may contact only a top surface of the partition P3 (providing a continuous extension of magnetic permeable material 889 between the top plate 892 and the bottom plate 891, while there is a respective gap between each of the top surfaces of partitions P1, P2, P4, and P5 with respect to the top plate 892 after completing assembly (when partitions and channels are disposed between bottom plate 891 and top plate 892). For example, a first axial end of partition P3 contacts the bottom plate 891 while a second axial end of the partition P3 contacts the top plate 892.

As further discussed herein, the presence of the channels in the magnetic permeable material 889 enables insertion, winding, etc., of electrically conductive paths (such as windings) to create one or more inductor components, transformers, etc., to produce a respective assembly 910 as further discussed below.

Figure 9:
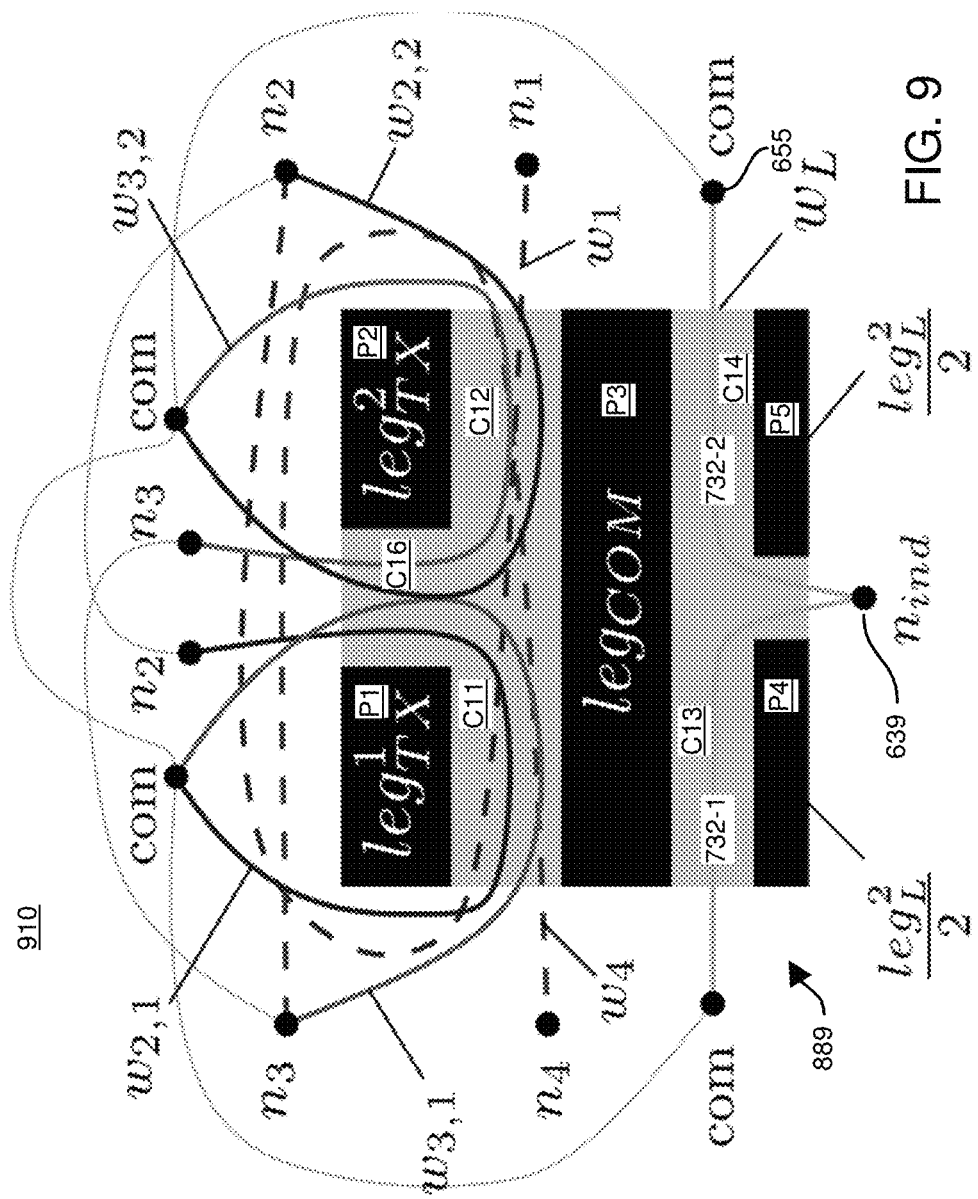
FIG. 9 is an example top view illustrating connectivity of multiple windings associated with an assembly including a transformer and multiple inductor components.

FIG. 9 is an example top view illustrating connectivity of multiple windings associated with an assembly including a transformer and multiple inductor components.

In this example, the core of magnetic permeable material 889 as previously discussed includes multiple channels and multiple partitions. Note that winding w2 is implemented via two parallel legs w2,1 and w2,2; winding w3 is implemented via two parallel legs w3,1 and w3,2.

The buck winding 732 is split in two parts disposed in channels C13 and C14, but the input and output nodes remain the same (the output node $W_L^{out}$ is internally connected to the same net). Inductor leg 2 ($\text{leg}_L^2$) is also split in two symmetrical parts with half of the initial area, while $\text{leg}_L^1$ is united with the mid-leg $\text{leg}_{TX}^m$ to become a larger leg $\text{leg}_{COM}$. Table I could be helpful to understand how the flux is split.

TABLE 1

Leg fluxes in the two implementations.

|  | Standard | Single-magnetic |
|---|---|---|
| $\text{leg}_{Tx}^{1/2}$ | AC | AC |
| $\text{leg}_{TX}^{m/COM}$ | AC | DC + AC |
| $\text{leg}_L$ | DC + AC | DC + AC |

$\text{leg}_{TX}^{m/COM}$ may be designed to have low reluctance: in other words, the magnetic circuit of the inductor and of the transformer must be shorted through this leg. This ensures maximum decoupling between the structures and efficiency maximization. One way to do this is to gap $\text{leg}_{TX}^{1/2}$ and $\text{leg}_L$, leaving $\text{leg}_{TX}^{m/COM}$ with no gap. In this way, both magnetic circuits are basically separated.

Especially with the single-inductor version of the hybrid sigma-converter version (matrix hybrid sigma converter), the advantages of the proposed solution are the simplification of the power distribution network (PDN) and the PCB area utilization reduction. When a single inductor is used, in fact, the standard implementation may require the inductor to deliver power from left-to-right or from right-to-left (horizontal inductor orientation and PDN asymmetry), or to place it on the transformer sides (vertical inductor orientation and PDN asymmetry) as already shown.

In addition to the PDN potential improvement the single magnetic allows to reduce the magnetic component count from 2 to 1: considering only the saving of footprint clearances, the available PCB area can be increased.

FIG. 10A is an example diagram illustrating connectivity of multiple windings in an assembly including a transformer and multiple inductor components. FIG. 10B is a top view diagram of the assembly in FIG. 10A.

To further improve the step-down and current capability of the multi-tapped autotransformer as previously discussed, FIGS. 10A and 10B illustrate a proposed matrix multi-tapped autotransformer, which inherently enable high step-down voltage capability. Thus, in FIG. 10A is reported the electric circuit and FIG. 10B is a possible magnetic implementation of such concept. It can be noticed that the two inductors are built using a part of the magnetic structure used for the matrix multi-tapped autotransformer wherein matrix multi-tapped autotransformer and inductors have one common node shorted. Such implementation can be used for a Sigma converter (or hybrid switched-capacitor converter) so as in an ISOP converter where both first and second converter are non-isolated. $w_1$, $w_2$, $w_3$, $w_4$ are wrapped around the center column with turns that can be integer on not integer number. $w_{L,1}$ and $w_{L,2}$ are wrapped around the outer column wherein one column is shared with the center-tapped autotransformer for each inductor. $w_{L,1}$ and $w_{L,2}$ can be also the output inductors of one or more regulated isolated converter.

Figure 11:
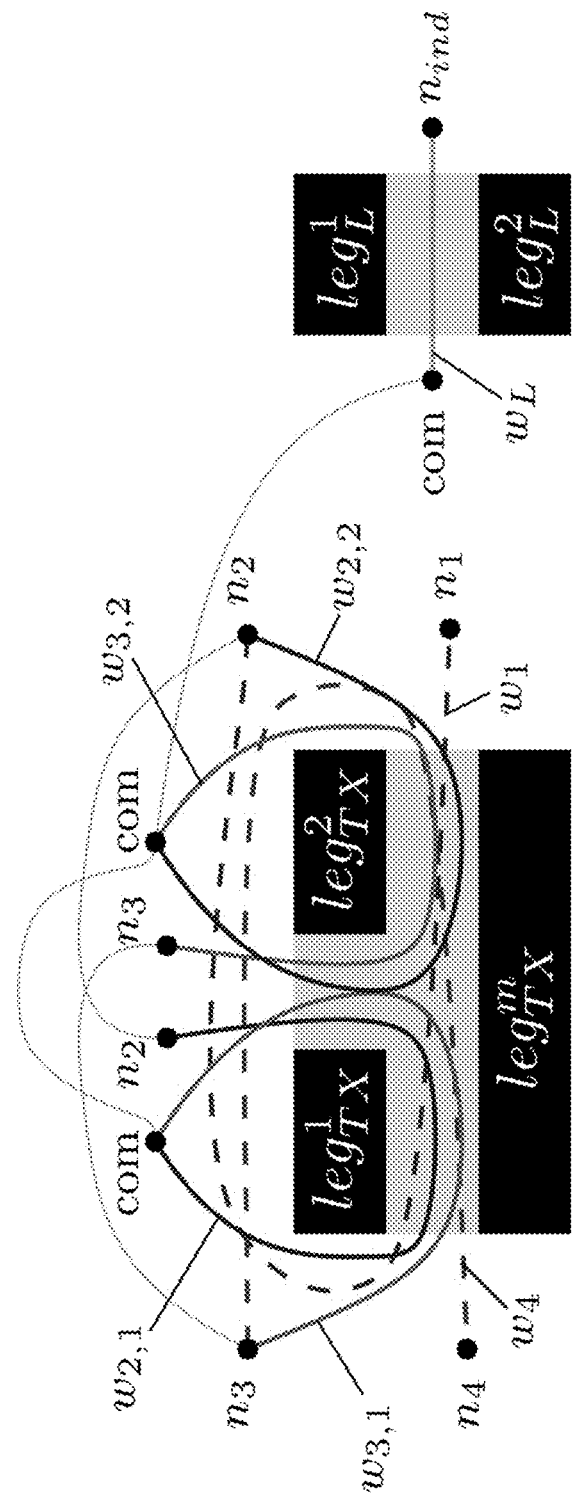
FIG. 11 is an example top view illustrating connectivity of multiple windings associated with a split assembly including a transformer and multiple inductor components.

FIG. 11A is an example diagram illustrating connectivity of multiple windings in an assembly including a transformer and multiple inductor components. FIG. 11B is a top view diagram of the assembly in FIG. 11A.

This assembly includes windings that have only one turn for the sake of simplicity, but this analysis can extend to a multi-turn structure as well.

Figure 12A:
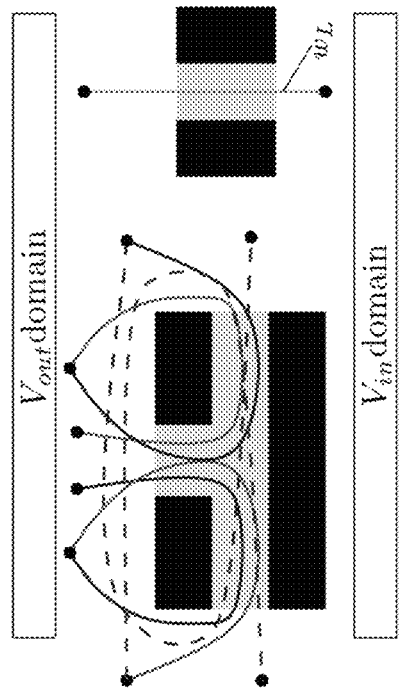
FIG. 12A is an example top view illustrating connectivity of multiple windings associated with a split assembly including a transformer and multiple inductor components.
Figure 12B:
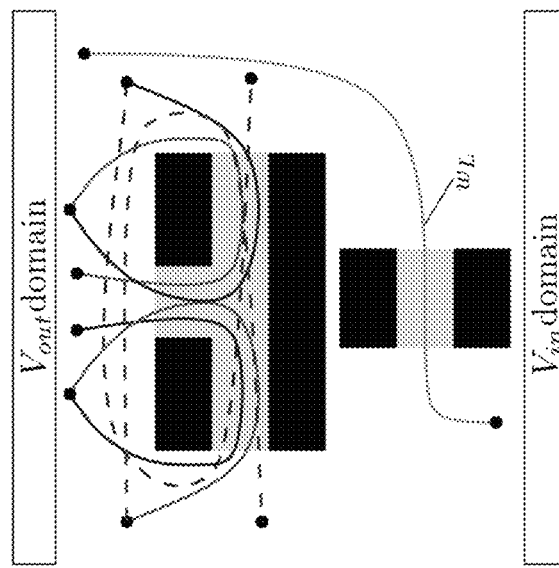
FIG. 12B is an example top view illustrating connectivity of multiple windings associated with a split assembly including a transformer and multiple inductor components.

FIG. 12A is an example top view diagram illustrating connectivity of multiple windings in an assembly including a transformer and multiple inductor components. FIG. 12B is an example top view diagram illustrating connectivity of multiple windings in an assembly including a transformer and multiple inductor components.

Note that as the matrix hybrid sigma converter is a sigma converter, the regulated block (buck) delivers a low percentage of the overall output power; for this reason, a single inductor solution (single phase) is sufficient for the addressed power range. As the power must be delivered from the input to the output domain, only asymmetric configurations can be achieved with a single discrete inductor, as previously shown, which could lead to sub-optimal current distributions in the converter. This is unless the inductor is placed above the transformer, but even in this case a "leg merging" could be desirable.

In FIG. 12A, the buck block delivers power from left-to-right reaching the output domain through internal layers, while in FIG. 12B the possible inductor positioning is shown on the right of the transformer.

FIG. 13 is a flowchart 1300 illustrating an example method implemented by a fabricator to produce one or more assemblies as discussed herein. Note that there will be some overlap with respect to concepts as discussed above.

In processing operation 1310, the fabricator receives a multi-component assembly including an inductor and a transformer. The inductor and the transformer are integrated to share a core of magnetic permeable material disposed in the multi-component assembly.

In processing operation 1320, the fabricator fabricates an unregulated power converter stage 121 of a power supply circuit assembly to include the inductor.

In processing operation 1330, the fabricator fabricates a regulated power converter stage 122 of the power supply circuit to include the transformer. The regulated power converter stage and the unregulated power converter stage are operative to collectively convert a received input voltage Vin into an output voltage Vout.

Note again that techniques herein are well suited for use in inductor and power converter applications. However, it should be noted that implementations herein are not limited to use in such applications and that the techniques discussed herein are well suited for other applications as well.

While this invention has been particularly shown and described with references to preferred implementations thereof, it will be understood by those skilled in the art that various changes in form and details may be made therein without departing from the spirit and scope of the present application as defined by the appended claims. Such variations are intended to be covered by the scope of this present application. As such, the foregoing description of implementations of the present application is not intended to be limiting. Rather, any limitations to the invention are presented in the following claims.

The invention claimed is:

1. A power supply comprising:
an assembly comprising an inductor and a transformer, the inductor and the transformer being integrated to share a core of magnetically permeable material disposed in the assembly, the core including a partition operative to provide magnetic decoupling of the inductor from the transformer;
an unregulated power converter stage including the transformer;
a regulated power converter stage including the inductor; and
the regulated power converter stage and the unregulated power converter stage operative to collectively produce an output voltage to power a load.

2. The power supply as in claim 1, wherein the unregulated power converter stage is operative to receive and convert a first input voltage into the output voltage; and
wherein the regulated power converter stage is operative to receive and convert a second input voltage into the output voltage.

3. The power supply as in claim 1, wherein the partition is fabricated from the magnetically permeable material in the core, the partition operative to convey both first magnetic flux generated via flow of first current through a winding of the transformer and second magnetic flux generated via flow of second current through the inductor.

4. The power supply as in claim 1, wherein the partition includes: a first partition of the magnetically permeable material, a second partition of the magnetically permeable material, and a third partition of the magnetically permeable material;
wherein the transformer includes a first winding and a second winding, the first winding magnetically coupled to the second winding;
wherein the inductor includes an inductor winding;
wherein the core of magnetically permeable material of the assembly includes a first channel in which the first winding and the second winding reside, the first channel disposed between the first partition of the magnetically permeable material and the second partition of the magnetically permeable material in the assembly; and
wherein the core of magnetically permeable material of the assembly includes a second channel in which the inductor winding resides, the second channel disposed between the second partition of the magnetically permeable material in the assembly and the third partition of the magnetically permeable material in the assembly.

5. The power supply as in claim 4, wherein the first winding and the second winding are wound around the first partition of the magnetically permeable material.

6. The power supply as in claim 4, wherein the magnetically permeable material includes a top portion and a bottom portion; and
wherein each of the first partition of the magnetically permeable material, the second partition of the magnetically permeable material, and the third partition of the magnetically permeable material are disposed in the assembly between the top portion and the bottom portion.

7. The power supply as in claim 6, wherein a first axial end of the second partition of the magnetically permeable material is configured to contact the top portion;
wherein a second axial end of the second partition of the magnetically permeable material is configured to contact the bottom portion, the assembly further comprising:
a first gap disposed between the top portion and the bottom portion, the first gap disposed in a first axial path extending through the top portion, the first partition of the magnetically permeable material, and the bottom portion; and
a second gap disposed between the top portion and the bottom portion, the second gap disposed in a second axial path extending through the top portion, the second partition of the magnetically permeable material, and the bottom portion.

8. The power supply as in claim 1, wherein the transformer provides galvanic isolation between the unregulated power converter stage and the regulated power converter stage.

9. The power supply as in claim 1, wherein the partition is a first partition;
wherein the core of magnetically permeable material includes a sequence of multiple partitions including the first partition, a second partition, and a third partition disposed along an axis, each of the multiple partitions extending between a top portion of the core and a bottom portion of the core, each of the multiple partitions fabricated from the magnetically permeable material;
wherein the transformer is fabricated from multiple transformer windings wound around the second partition;
wherein the first partition is operative to convey magnetic flux generated by the multiple transformer windings and magnetic flux generated by the inductor; and wherein the third partition is operative to convey magnetic flux generated by the multiple transformer windings and magnetic flux generated by the inductor.

10. The power supply as in claim 1, wherein a winding of the inductor is directly coupled to a winding of the transformer to produce the output voltage.

11. The power supply as in claim 1, wherein the transformer is an autotransformer.

12. The power supply as in claim 1, wherein the partition is fabricated from the magnetically permeable material, the partition providing a separation between the transformer and the inductor.

13. The power supply as in claim 1, wherein the assembly includes:
a first channel and a second channel, a winding of the inductor disposed in the first channel, a winding of the transformer disposed in the second channel; and
wherein the partition is fabricated from the magnetically permeable material, the partition disposed between the first channel and the second channel.

14. The power supply as in claim 1, wherein the inductor is fabricated at least in part from a first portion of the magnetically permeable material;
wherein the transformer is fabricated at least in part from a second portion of the magnetically permeable material, the inductor magnetically decoupled from windings of the transformer via the partition.

15. The power supply as in claim 14, wherein the partition is operative to convey magnetic flux generated by the windings of the transformer and magnetic flux generated by the inductor.

16. The power supply as in claim 1, wherein the partition is operative to convey magnetic flux generated by the windings of the transformer and magnetic flux generated by the inductor.

17. The power supply as in claim 1, wherein the unregulated power converter stage includes a switched-capacitor converter; and
wherein the regulated power converter stage is operative to control a flow of current through the inductor to produce the output voltage.

18. The power supply as in claim 1, wherein the unregulated power converter stage is operative to generate an intermediate voltage supplied to the regulated power converter stage; and
wherein the regulated power converter stage is operative to produce the output voltage from the intermediate voltage.

19. A power supply comprising:
an assembly comprising an inductor and a transformer, the inductor and the transformer being integrated to share a core of magnetically permeable material disposed in the assembly;
an unregulated power converter stage including the transformer;
a regulated power converter stage including the inductor;
the regulated power converter stage and the unregulated power converter stage operative to collectively produce an output voltage to power a load;
wherein the unregulated power converter stage includes a switched-capacitor converter, a combination of the switched-capacitor converter and the transformer operative to produce the output voltage; and
wherein the regulated power converter stage is operative to control a flow of current through the inductor to produce the output voltage.

20. The power supply as in claim 19, wherein the unregulated power converter stage is operative to generate an intermediate voltage supplied to the regulated power converter stage; and
wherein the regulated power converter stage is operative to produce the output voltage from the intermediate voltage.

21. The power supply as in claim 19, wherein the assembly includes:
a partition fabricated from the magnetically permeable material in the magnetic core, the partition operative to convey both first magnetic flux generated via flow of first current through a winding of the transformer and second magnetic flux generated via flow of second current through the inductor.

22. The power supply as in claim 21, wherein presence of the partition in the assembly is operative to magnetically decouple the inductor from the winding of the transformer.

23. The power supply as in claim 19, wherein the assembly includes:
a first channel and a second channel, wherein a winding of the inductor is disposed in the first channel, wherein a winding of the transformer is disposed in the second channel; and
wherein the partition is disposed between the first channel and the second channel.

24. A method comprising:
receiving a multi-component assembly including an inductor and a transformer, the inductor and the transformer being integrated to share a core of magnetically permeable material disposed in the multi-component assembly, the multi-complement assembly comprising a partition operative to magnetically decouple the winding of the inductor from a winding of the transformer;
fabricating an unregulated power converter stage of a power supply circuit assembly to include the inductor;
fabricating a regulated power converter stage of the power supply circuit to include the transformer; and
wherein the regulated power converter stage and the unregulated power converter stage are operative to collectively convert a received input voltage into an output voltage.

25. The method as in claim 24, wherein the partition is fabricated from the magnetically permeable material in the magnetic core, the partition operative to convey both first magnetic flux generated via flow of first current through the winding of the transformer and second magnetic flux generated via flow of second current through the inductor.

* * * * *

UNITED STATES PATENT AND TRADEMARK OFFICE
CERTIFICATE OF CORRECTION

PATENT NO. : 12,126,258 B2
APPLICATION NO. : 17/670755
DATED : October 22, 2024
INVENTOR(S) : Mario Ursino, Stefano Saggini and Roberto Rizzolatti It is certified that error appears in the above-identified patent and that said Letters Patent is hereby corrected as shown below:

In the Claims

Claim 24, Line 7, replace "the" with --a--
Claim 24, Line 8, replace "a winding" with --windings--

Signed and Sealed this
Tenth Day of December, 2024

Katherine Kelly Vidal
*Director of the United States Patent and Trademark Office*